(12) United States Patent
Beaver et al.

(10) Patent No.: US 12,032,543 B2
(45) Date of Patent: Jul. 9, 2024

(54) FRAMEWORK FOR THE AUTOMATED DETERMINATION OF CLASSES AND ANOMALY DETECTION METHODS FOR TIME SERIES

(71) Applicant: Verint Americas Inc., Alpharetta, GA (US)

(72) Inventors: Ian Roy Beaver, Spokane Valley, WA (US); Cynthia Freeman, Spokane Valley, WA (US); Jonathan Merriman, Spokane Valley, WA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

(21) Appl. No.: 18/103,023

(22) Filed: Jan. 30, 2023

(65) Prior Publication Data

US 2023/0177030 A1      Jun. 8, 2023

Related U.S. Application Data

(63) Continuation of application No. 16/569,984, filed on Sep. 13, 2019, now Pat. No. 11,567,914.

(Continued)

(51) Int. Cl.
*G06F 16/215*      (2019.01)
*G06F 16/2458*     (2019.01)

(52) U.S. Cl.
CPC ........ *G06F 16/215* (2019.01); *G06F 16/2474* (2019.01)

(58) Field of Classification Search
CPC ........... G06F 16/21; G06F 16/24; G06F 17/18
See application file for complete search history.

(56) References Cited

U.S. PATENT DOCUMENTS 6,772,120 B1    8/2004   Moreno et al.
9,256,663 B2    2/2016   Bhatia et al.
(Continued)

FOREIGN PATENT DOCUMENTS

EP      3623964        3/2020
JP      2020201232     12/2020
(Continued)

OTHER PUBLICATIONS

Aktolga, E., et al., "Detecting Outlier Sections in US Congressional Legislation," Proceedings of the 34th International ACM SIGIR Conference on Research and Development in Information Retrieval, 2011, pp. 235-244.

(Continued)

*Primary Examiner* — Maher N Algibhah
(74) *Attorney, Agent, or Firm* — Meunier Carlin & Curfman LLC

(57) ABSTRACT

Disclosed are a framework and method for selecting an anomaly detection method for each of a plurality of class of time series based on characteristics a time series example that represents an expected form of data. The method provides classification of a given time series into one of known classes based on expected properties of the time series, filtering the set of possible detection methods based on the time series class, evaluating the remaining detection methods on the given time series using the specific evaluation metric and selecting and returning a recommended anomaly detection method based on the specific evaluation metric.

20 Claims, 15 Drawing Sheets

Related U.S. Application Data

(60) Provisional application No. 62/731,258, filed on Sep. 14, 2018.

(56) References Cited

U.S. PATENT DOCUMENTS

| | | |
|---|---|---|
| 9,407,651 B2 | 8/2016 | Mathis |
| 9,411,800 B2 | 8/2016 | Morin et al. |
| 9,729,727 B1 | 8/2017 | Zhang |
| 10,459,827 B1 | 10/2019 | Aghdaie |
| 10,607,604 B2 | 3/2020 | Itoh et al. |
| 10,673,880 B1 | 6/2020 | Pratt |
| 10,805,327 B1 | 10/2020 | Grilli |
| 10,896,472 B1 | 1/2021 | Stack et al. |
| 11,222,627 B1 | 1/2022 | Qian et al. |
| 11,334,832 B2 | 5/2022 | Dumoulin |
| 2007/0299798 A1 | 12/2007 | Suyama et al. |
| 2008/0052259 A1 | 2/2008 | Shiffman et al. |
| 2008/0077358 A1 | 3/2008 | Marvasti |
| 2009/0192781 A1 | 7/2009 | Bangalore et al. |
| 2012/0109651 A1 | 5/2012 | Chen |
| 2012/0127540 A1 | 5/2012 | Moore et al. |
| 2012/0136703 A1 | 5/2012 | Stewart |
| 2012/0136704 A1 | 5/2012 | Carlson et al. |
| 2012/0143860 A1 | 6/2012 | Gherman et al. |
| 2012/0254333 A1 | 10/2012 | Chandramouli et al. |
| 2013/0018650 A1 | 1/2013 | Moore et al. |
| 2013/0046531 A1 | 2/2013 | Chandramouli et al. |
| 2013/0138428 A1 | 5/2013 | Chandramouli et al. |
| 2013/0246386 A1 | 9/2013 | Gherman et al. |
| 2014/0222476 A1 | 8/2014 | Romano |
| 2014/0280621 A1 | 9/2014 | Bourdaillet et al. |
| 2015/0047026 A1 | 2/2015 | Neil et al. |
| 2015/0081494 A1 | 3/2015 | Erdelmeier |
| 2016/0019479 A1 | 1/2016 | Busch |
| 2016/0117466 A1 | 4/2016 | Singh |
| 2016/0170996 A1 | 6/2016 | Frank et al. |
| 2016/0267490 A1 | 9/2016 | Johnson |
| 2016/0321430 A1* | 11/2016 | Eckman .................. G16H 40/63 |
| 2017/0068709 A1 | 3/2017 | Dasgupta et al. |
| 2017/0076202 A1 | 3/2017 | George |
| 2017/0294192 A1 | 10/2017 | Bradley et al. |
| 2017/0357828 A1 | 12/2017 | Phillips |
| 2018/0018686 A1 | 1/2018 | Wood et al. |
| 2018/0032862 A1 | 2/2018 | Oliner et al. |
| 2018/0048661 A1 | 2/2018 | Bird et al. |
| 2018/0091539 A1 | 3/2018 | Marquardt et al. |
| 2018/0113782 A1 | 4/2018 | Valacich et al. |
| 2018/0174600 A1 | 6/2018 | Chaudhuri et al. |
| 2018/0204217 A1 | 7/2018 | Bendi |
| 2018/0217749 A1 | 8/2018 | Alsharif et al. |
| 2018/0219889 A1 | 8/2018 | Oliner |
| 2018/0316704 A1 | 11/2018 | Joseph Durairaj et al. |
| 2018/0373991 A1 | 12/2018 | Rosenberg et al. |
| 2019/0188741 A1 | 6/2019 | Wood et al. |
| 2019/0205771 A1 | 7/2019 | Lin et al. |
| 2019/0236139 A1 | 8/2019 | DeFelice et al. |
| 2019/0236148 A1 | 8/2019 | DeFelice |
| 2019/0236177 A1 | 8/2019 | Jain |
| 2019/0304470 A1 | 10/2019 | Ghaemmaghami et al. |
| 2019/0354524 A1 | 11/2019 | Xu et al. |
| 2019/0370610 A1 | 12/2019 | Batoukov |
| 2019/0392252 A1 | 12/2019 | Fighel |
| 2020/0160229 A1 | 5/2020 | Atcheson |
| 2020/0286469 A1 | 9/2020 | Freeman |
| 2020/0386656 A1 | 12/2020 | Jung |
| 2020/0401768 A1 | 12/2020 | Freeman |
| 2021/0042110 A1 | 2/2021 | Basyrov |
| 2021/0081501 A1 | 3/2021 | RoyChowdhury et al. |
| 2022/0180061 A1 | 6/2022 | Kim et al. |
| 2022/0189599 A1 | 6/2022 | Petch et al. |
| 2023/0004891 A1 | 1/2023 | Dumoulin |

FOREIGN PATENT DOCUMENTS

| | | |
|---|---|---|
| KR | 1020180081444 | 7/2018 |
| WO | 2007/005975 | 1/2007 |
| WO | 2018/128403 | 7/2018 |
| WO | 2019/060327 | 3/2019 |

OTHER PUBLICATIONS

Allen, L., et al., "On Twitter Purge: A Retrospective Analysis of Suspended Users," Association for the Advancement of Artificial Intelligence, 2020, 8 pages.

Buck, C., et al., "N-gram Counts and Language Models from the Common Crawl," Proceedings of the Ninth International Conference on Language Resources and Evaluation (LREC), 2014, pp. 3579-3584.

Chandola, V., et al., "Anomaly Detection: A Survey," ACM Computing Surveys, vol. 41, No. 3, Article 15, 2009, 58 pages.

Cheung, Y.-W., et al., "Lag Order and Critical Values of the Augmented Dickey-Fuller Test," Journal of Business & Economic Statistics, vol. 13, No. 3, 1995, pp. 277-280.

Cleveland, R.B., et al., "STL: A Seasonal-Trend Decomposition Procedure Based on Loess," Journal of Official Statistics, vol. 6, No. 1, 1990, pp. 3-73.

Danescu-Niculescu-Mizil, C., et al., "No Country for Old Members: User Lifecycle and Linguistic Change in Online Communities," Proceedings of the 22nd International Conference on World Wide Web, 2013, pp. 307-318.

Forsyth, E., et al., "The NPS Chat Corpus," retrieved on Apr. 21, 2020 at http://faculty.nps.edu/cmartell/NPSChat.htm, 2019, 2 pages.

Freeman, C., et al., "Experimental Comparison of Online Anomaly Detection Algorithms," The 32nd International Florida Artificial Intelligence Research Society Conference (Flairs-32), 2019, pp. 364-369.

Grave, E., et al., "Unbounded cache model for online language modeling with open vocabulary," Advances in Neural Information Processing Systems, 2017, pp. 6042-6052.

Guthrie, D., et al., "An Unsupervised Approach for the Detection of Outliers in Corpora," Statistics, 2008, pp. 3409-3413.

Guthrie, D., "Unsupervised Detection of Anomalous Text," Thesis, 2008, 186 pages.

Herath, J.D., et al., "RAMP: Real-Time Anomaly Detection in Scientific Workflows," IEEE International Conference on Big Data (Big Data), 2019, pp. 1367-1374.

Hyndman, R.J., et al., "Automatic Time Series Forecasting: The forecast Package for R," Journal of Statistical Software, vol. 27, Issue 3, 2008, 22 pages.

Inouye, D., et al., "A Review of Multivariate Distributions for Count Data Derived from the Poisson Distribution," Computational Statistics, vol. 9, No. 3, 2017, 40 pages.

Isbister, T., "Anomaly detection on social media using ARIMA models," Thesis, Uppsala Universitet, 2015, 38 pages.

Jain, S., et al., "Characterizing and Detecting Livestreaming Chatbots," IEEE/ACM International Conference on Advances in Social Networks Analysis and Mining, 2019, pp. 683-690.

Jozefowicz, R., et al., "Exploring the Limits of Language Modeling," arXiv preprint arXiv:1602.02410, 2016, 11 pages.

Kannan, R., et al., "Outlier Detection for Text Data," 15th Proceedings of the 2017 SIAM International Conference on Data Mining, 2017, pp. 489-497.

Kenter, T., et al., "Short Text Similarity with Word Embeddings," Proceedings of the 24th ACM International Conference on Information and Knowledge Management, 2015, pp. 1411-1420.

Kowalska, K., et al., "Maritime Anomaly Detection using Gaussian Process Active Learning," IEEE 15th International Conference on Information Fusion, 2012, pp. 1164-1171.

Lata, L., et al., "A Comprehensive Survey of Fraud Detection Techniques," International Journal of Applied Information Systems, vol. 10, No. 2, 2015, pp. 26-32.

Lili, C., "Research of E-commerce Supply Chain Management with CreditRisk + model," International Conference on Management of e-Commerce and e-Government, 2012, 353-355, 3 pages.

(56) References Cited

OTHER PUBLICATIONS

Linden, M., "Testing Growth Convergence with Time Series Data—a non—parametric approach," International Review of Applied Economics, vol. 14, Issue 3, 2000, pp. 361-370.
Lowe, R., et al., "The Ubuntu Dialogue Corpus: A Large Data Set for Research in Unstructured Multi-Turn Dialogue Systems," Proceedings of the SIGDIAL 2015 Conference, 2015, pp. 285-294.
Madrid, F., et al., "Efficient and Effective Labeling of Massive Entomological Datasets," IEEE International Conference on Data Science and Advanced Analytics (DSAA), 2019, 9 pages.
"Media Bias Fact Check," NowThis News, retrieved on Apr. 21, 2020 at https://mediabiasfactcheck.com/nowthis-news/, 2019, 5 pages.
Mueen, A., et al., "The Fastest Similarity Search Algorithm for Time Series Subsequences under Euclidean Distance and Correlation Coefficient," retrieved on May 27, 2020 at http://www.cs.unm.edu/~mueen/FastestSimilaritySearch.html, 2017, 3 pages.
Norvig, P., "How to Write a Spelling Corrector," retrieved on May 27, 2020 at https://norvig.com/spell-correct.html, 2007, 10 pages.
Phua, C., et al., "A Comprehensive Survey of Data Mining-based Fraud Detection Research," arXiv preprint arXiv:1009.6119, 2010, 14 pages.
Prusher, I, "Parkland Mourns. Tragedy Strikes a Florida Community," Time, 2018, 7 pages.
Robertson, S., et al., "The Probabilistic Relevance Framework: BM25 and Beyond," Foundations and Trends in Information Retrieval, vol. 3, No. 4, 2009, pp. 333-389.
Rodriguez, J., "Poisson Models for Count Data," Acesso, vol. 10, No. 2, 2007, 14 pages.
Salvatier, J., et al., "Probabilistic Programming in Python using PyMC3," PeerJ Computer Science, 2016, 20 pages.
Savage, D., et al., "Anomaly Detection in Online Social Networks," Social Networks, vol. 39, No. 1, 2014, pp. 62-70.
Schreiber, J, "Pomegranate: fast and flexible probabilistic modeling in python," The Journal of Machine Learning Research, vol. 18, No. 1, 2017, pp. 5992-5997.
Shaoul, C., et al., "A reduced redundancy USENET corpus (2005-2011)," Westbury Lab Web Site, retrieved on Apr. 21, 2020 at http://www.psych.ualberta.ca/~westburylab/downloads/usenetcorpus.download.htm 1, 2013, 2 pages.
Sordoni, A., et al., "A Neural Network Approach to Context-Sensitive Generation of Conversational Responses," arXiv:1506.06714v1, 2015, 11 pages.
Steyn, H. "On the multivariate poisson normal distribution," Journal of the American Statistical Association, vol. 71, No. 353, 1976, pp. 233-236.
"The Numenta Anomaly Benchmark," retrieved on Apr. 24, 2020 at https://github.com/numenta/NAB, 2018, 5 pages.
Vallis, O., et al., "A Novel Technique for Long-Term Anomaly Detection in the Cloud," HotCloud, 2014, 6 pages.
Wang, Z., et al. "Automatic Model Selection for Anomaly Detection," IEEE Computer Society, TrustCom-BigDataSE-ISPA, 2016, pp. 276-283.
Xia, Y., et al., "NIL is Not Nothing: Recognition of Chinese Network Informal Language Expressions," Proceedings of the 4th SIGHAN Workshop on Chinese Language Processing, 2005, 8 pages.
Zhu, L., et al., "Deep and Confident Prediction for Time Series at Uber," IEEE International Conference on Data Mining Workshops (ICDMW), 2017, 8 pages.
Zhuang, H., et al., "Identifying Semantically Deviating Outlier Documents," Proceedings of the 2017 Conference on Empirical Methods in Natural Language Processing, 2017, pp. 2748-2757.
Search Report, dated Jan. 21, 2020, received in connection with corresponding EP Patent Application No. 19197374.2.
Adams, R., et al., "Bayesian Online Changepoint Detection," arXiv preprint arXiv:0710.3742, 2007, 7 pages.
Ahmad, S., et al., "Unsupervised real-time anomaly detection for streaming data," Neurocomputing, vol. 262, 2017, pp. 134-147.
"Anomaly Detection: Numenta Anomaly Bechmark," Machine Intelligence Technology, 2017, 7 pages.
Brownlee, J., "How to Check if Time Series Data is Stationary with Python," retrieved on Dec. 13, 2019 at https://machinelearningmastery.com/time-series-data-stationary-python, 2016, 51 pages.
Choudhary, S., et al., Sparse Decomposition for Time Series Forecasting and Anomaly Detection, Proceedings of the SIAM International Conference on Data Mining, 2018, pp. 522-530.
"datastream.io," Mentat Innovations, retrieved on Jan. 6, 2020 from https://blog.ment.at/datastream-io-4863db7286b7, 2017, 2 pages.
Fulton, C., "Estimating time series models by state space methods in Python: Statsmodels," http://www.chadfulton.com/fulton_statsmodels, 2017, 78 pages.
Hochenbaum, J., et al., "Automatic Anomaly Detection in the Cloud Via Statistical Learning," arXiv preprint arXiv:1704.07706, 2017, 13 pages.
Keshvani, A., "How to use the Autocorreation Function (ACF)?," https://coolstatsblog.com/2013/08/07/how-to-use-the-autocorreation-function-acf, 2013, 2 pages.
Kulick, J., "Bayesian change-point detection," https://github.com/hildensia/bayesian_changepoint_detection, 2016, 1 page.
Laptev, N., et al., "Generic and Scalable Framework for Automated Time-series Anomaly Detection," Proceedings of the 21th ACM SIGKDD International Conference on Knowledge Discovery and Data Mining, 2015, pp. 1939-1947.
Lavin, A., et al., "Evaluating Real-time Anomaly Detection Algorithms—the Numenta Anomaly Benchmark," IEEE 14th International Conference on Machine Learning and Applications (ICMLA), 2015, pp. 38-44.
Liu, S., et al., "Online Conditional Outlier Detection in Nonstationary Time Series," Proceedings of the International Florida AI Research Society Conference. Florida AI Research Symposium, HHS Public Access, 2017, 15 pages.
Liu, D., et al., "Opprentice: Towards Practical and Automatic Anomaly Detection Through Machine Learning," Proceedings of the 2015 Internet Measurement Conference (ACM), 2015, pp. 211-224.
Saurav, S., et al., "Online Anomaly Detection with Concept Drift Adaptation using Recurrent Neural Networks," Proceedings of the ACM India Joint International Conference on Data Science Management of Data, 2018, pp. 78-87.
Seabold, S., et al., "Statsmodels: Econometric and Statistical Modeling with Python," Proceedings of the 9th Python in Science Conference (SCIPY), 2010, 57 pages.
Singh, N., et al., "Demystifying Numenta Anomaly Benchmark," IEEE International Joint Conference on Neural Networks (IJCNN), 2017, pp. 1570-1577.
Taylor, S., et al., "Forecasting at Scale," https://facebookincubator, 2017, pp. 37-45.
Tatbul, N., et al., "Precision and Recall for Time Series," 32nd Conference on Neural Information Processing Systems (NeurIPS), 2018, 11 pages.
Yamanishi, K., et al., "On-line Unsupervised Outlier Detection Using Finite Mixtures with Discounting Learning Algorithms," Data Mining and Knowledge Discovery, vol. 8, No. 3, 2004, pp. 275-300.
Kelly, S., et al., "Propagating Disaster Warnings on Social and Digital Media," International Conference on Pervasive Computing, 2015, pp. 475-484.
Chen, Y-C, et al., "Event Detection using Customer Care Calls," Proceedings of the IEEE International Conference on Computer Communications (INFOCOM), 2013, pp. 1690-1698.
Jiang, N., "Perplexity Vs Cross-entropy," retrieved on Oct. 2, 2020 from https://jiangnanhugo.github.io/2016/perplexity-vs-cross-entropy, 2016, 3 pages.
Mäkinen, M. S., "Deep Learning for Anomaly Detection in Linux System Log," Thesis, Aalto University School of Science, 2019, 61 pages.
Freeman, C., et al., "Human-in-the-Loop Selection of Optimal Time Series Anomaly Detection Methods," 7th AAAI Conference on Human Computation and Crowdsourcing (HCOMP), 2019, 3 pages.
Banerjee, A., et al., "Anomaly Detection: A Tutorial," SIAM Conference on Data Mining, 2008, 103 pages.
Hawkins, J., et al., "Hierarchical Temporal Memory including HTM Cortical Learning Algorithms," Numenta, 2011, 68 pages.

(56) References Cited

OTHER PUBLICATIONS

Hodge, V., et al., "A Survey of Outlier Detection Methodologies," Artificial Intelligence Review, vol. 22, No. 2, 2004, pp. 85-126.
Hyndman, R. J., "Anomalous time-series R Package," retrieved on Nov. 5, 2020 from https://github.com/robjhyndman/anomalous, 2018, 3 pages.
Keogh, E., et al., "HOT SAX: Efficiently Finding the Most Unusual Time Series Subsequence," The $5^{th}$ IEEE International Conference on Data Mining (ICDM), 2005, pp. 440-449.
"Luminol," LinkedIn, retrieved on Nov. 5, 2020 from https://github.com/linkedin/luminol, 2018, 9 pages.
Morgan, A., et al., "Anomalyzer: Probabilistic anomaly detection for time series data," Lytics, retrieved on Nov. 4, 2020 from https://github.com/lytics/anomalyzer, 2015, 4 pages.
"Skyline," Etsy, retrieved on Nov. 5, 2020 from https://github.com/etsy/skyline, 2015, 5 pages.
"Surus," Netflix, retrieved on Nov. 5, 2020 from https://github.com/Netflix/Surus, 2015, 3 pages.
Summons to attend oral proceeding pursuant to Rule 115(1) EPC, issued on Feb. 24, 203, for European Application No. 19201202.9.
Communication pursuant to Article 94(3) EPC for Application No. 20 736 855.6, dated Mar. 14, 2023.
Susanna Minttu et al.: "Deep Learning for Anomaly Detection in Linux System Log", May 27, 2019 (May 27, 2019), XP055730619.
Office action issued for U.S. Appl. No. 16/985,511, dated Dec. 19, 2023.

\* cited by examiner

FIG. 9

| | Windowed Gaussian | SARIMAX | Prophet | Anomalous | GLiM | HOT-SAX | HTM | STL | Twitter |
|---|---|---|---|---|---|---|---|---|---|
| 128 | 0.37 | 0.49 | 0.37 | 0.29 | 0.4 | 0.23 | 0.51 | 0.2 | 0.49 |
| 256 | 0.4 | 0.47 | 0.39 | 0.29 | 0.4 | 0.23 | 0.51 | 0.2 | 0.49 |
| 512 | 0.36 | 0.43 | 0.44 | 0.29 | 0.4 | 0.23 | 0.51 | 0.22 | 0.49 |
| 768 | 0.37 | 0.44 | 0.42 | 0.29 | 0.45 | 0.23 | 0.51 | 0.26 | 0.49 |
| 1024 | 0.36 | 0.46 | 0.4 | 0.29 | 0.41 | 0.23 | 0.51 | 0.26 | 0.49 |

FIG. 10

| | Windowed Gaussian | SARIMAX | Prophet | Anomalous | GLiM | HOT-SAX | HTM | STL | Twitter |
|---|---|---|---|---|---|---|---|---|---|
| 128 | 35.31 | 41.96 | 40.34 | 36.91 | 40.34 | 37.97 | 42.74 | 32.32 | 39.03 |
| 256 | 39.69 | 41.36 | 39.96 | 36.91 | 41.4 | 37.97 | 42.74 | 32.32 | 39.03 |
| 512 | 39.05 | 41.63 | 41.8 | 36.91 | 40.25 | 37.97 | 42.74 | 32.32 | 39.03 |
| 768 | 39.03 | 41.24 | 40.06 | 36.91 | 39.61 | 37.97 | 42.74 | 32.32 | 39.03 |
| 1024 | 37.83 | 42.43 | 39.32 | 36.91 | 39.45 | 37.97 | 42.74 | 32.32 | 39.03 |

FIG. 11

| | Windowed Gaussian | SARIMAX | Prophet | Anomalous | GLiM | HOT-SAX | HTM | STL | Twitter |
|---|---|---|---|---|---|---|---|---|---|
| 128 | 0.46 | 0.51 | 0.47 | 0.21 | 0.41 | 0.21 | 0.46 | 0.2 | 0.42 |
| 256 | 0.5 | 0.5 | 0.49 | 0.21 | 0.49 | 0.21 | 0.46 | 0.2 | 0.42 |
| 512 | 0.46 | 0.5 | 0.46 | 0.21 | 0.49 | 0.21 | 0.46 | 0.26 | 0.42 |
| 768 | 0.46 | 0.5 | 0.42 | 0.21 | 0.54 | 0.21 | 0.46 | 0.26 | 0.42 |
| 1024 | 0.46 | 0.53 | 0.42 | 0.21 | 0.5 | 0.21 | 0.46 | 0.26 | 0.42 |

| | Windowed Gaussian | SARIMAX | Prophet | Anomalous | GLiM | HOT-SAX | HTM | STL | Twitter |
|---|---|---|---|---|---|---|---|---|---|
| 128 | 33.3 | 42.24 | 12.68 | 37.92 | 39.95 | 37.98 | 41.28 | 36.11 | 39.32 |
| 256 | 41.83 | 40.03 | 27.98 | 37.92 | 41.93 | 37.98 | 41.28 | 36.11 | 39.32 |
| 512 | 40.68 | 41.75 | 39.66 | 37.92 | 42.02 | 37.98 | 41.28 | 36.11 | 39.32 |
| 768 | 40.53 | 41.67 | 37.64 | 37.92 | 41.23 | 37.98 | 41.28 | 36.11 | 39.32 |
| 1024 | 38.82 | 42.71 | 40.78 | 37.92 | 40.94 | 37.98 | 41.28 | 36.11 | 39.32 |

FIG. 12

| | Windowed Gaussian | SARIMAX | Prophet | Anomalous | GLiM | HOT-SAX | HTM | STL | Twitter |
|---|---|---|---|---|---|---|---|---|---|
| 128 | 0.49 | 0.39 | 0.33 | 0 | 0.46 | 0.21 | 0.52 | 0 | 0 |
| 256 | 0.33 | 0.34 | 0.26 | 0 | 0.5 | 0.21 | 0.52 | 0 | 0 |
| 512 | 0.35 | 0.38 | 0.28 | 0 | 0.52 | 0.21 | 0.52 | 0 | 0 |
| 768 | 0.35 | 0.39 | 0.27 | 0 | 0.54 | 0.21 | 0.52 | 0 | 0 |
| 1024 | 0.39 | 0.42 | 0.39 | 0 | 0.57 | 0.21 | 0.52 | 0 | 0 |

FIG. 13

| | Windowed Gaussian | SARIMAX | Prophet | Anomalous | GLiM | HOT-SAX | HTM | STL | Twitter |
|---|---|---|---|---|---|---|---|---|---|
| 128 | 28.5 | 31.65 | 7.87 | 0 | 36.84 | 36.37 | 40.31 | 0 | 0 |
| 256 | 29.67 | 39.82 | 21.57 | 0 | 38.39 | 36.37 | 40.31 | 0 | 0 |
| 512 | 27.32 | 40.39 | 32.42 | 0 | 38.41 | 36.37 | 40.31 | 0 | 0 |
| 768 | 33.34 | 38.7 | 33.74 | 0 | 39.32 | 36.37 | 40.31 | 0 | 0 |
| 1024 | 33.43 | 41.22 | 35.1 | 0 | 39.05 | 36.37 | 40.31 | 0 | 0 |

FIG. 14

|      | Windowed Gaussian | SARIMAX | Prophet | Anomalous | GLiM | HOT-SAX | HTM | STL | Twitter |
|------|---|---|---|---|---|---|---|---|---|
| 128  | 0 | 0.26 | 0.31 | 0 | 0.32 | 0 | 0 | 0.2 | 0 |
| 256  | 0 | 0.25 | 0.31 | 0 | 0.35 | 0 | 0 | 0.2 | 0 |
| 512  | 0 | 0.28 | 0.44 | 0 | 0.39 | 0 | 0 | 0.2 | 0 |
| 768  | 0 | 0.22 | 0.46 | 0 | 0.47 | 0 | 0 | 0.2 | 0 |
| 1024 | 0 | 0.24 | 0.42 | 0 | 0.44 | 0 | 0 | 0.2 | 0 |

FIG. 15

|      | Windowed Gaussian | SARIMAX | Prophet | Anomalous | GLiM | HOT-SAX | HTM | STL | Twitter |
|------|---|---|---|---|---|---|---|---|---|
| 128  | 0 | 36.08 | 5.63  | 0 | 40.07 | 0 | 0 | 25.23 | 0 |
| 256  | 0 | 35.64 | 18.4  | 0 | 39.48 | 0 | 0 | 30.11 | 0 |
| 512  | 0 | 35.87 | 35.67 | 0 | 40.3  | 0 | 0 | 31.7  | 0 |
| 768  | 0 | 35.27 | 34.93 | 0 | 41.02 | 0 | 0 | 33.81 | 0 |
| 1024 | 0 | 35.16 | 36.11 | 0 | 40.79 | 0 | 0 | 33.3  | 0 |

FIG. 16

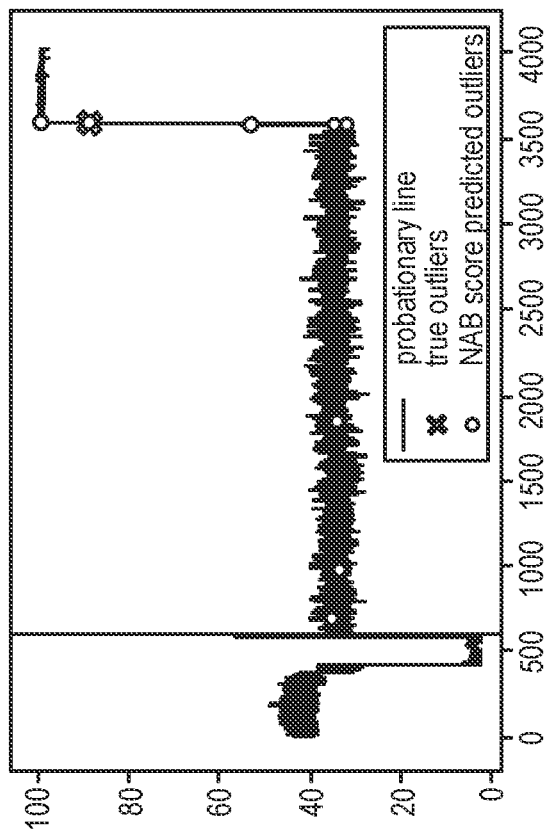
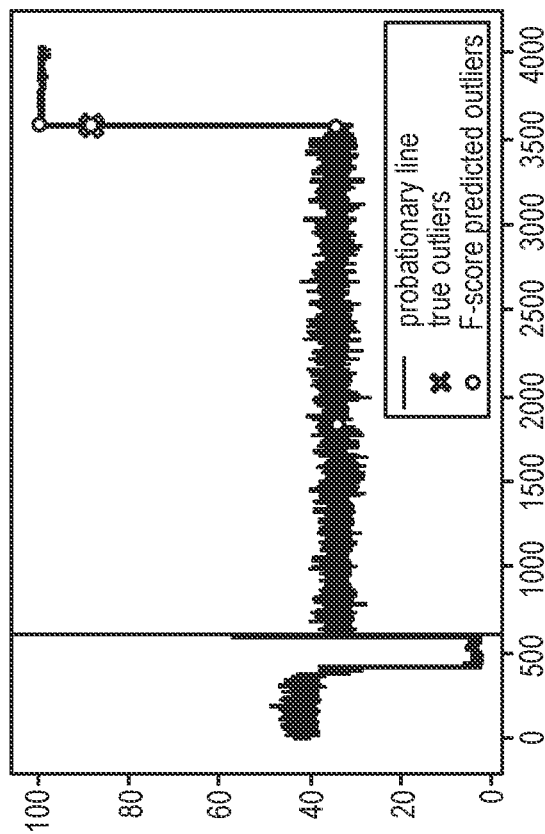
FIG. 19A
FIG. 19B

FRAMEWORK FOR THE AUTOMATED DETERMINATION OF CLASSES AND ANOMALY DETECTION METHODS FOR TIME SERIES

CROSS REFERENCE TO RELATED APPLICATIONS

This application is a continuation of and claims priority to U.S. patent application Ser. No. 16/569,984, pending, filed Sep. 13, 2019, which claims priority to Provisional Patent Application Ser. No. 61/731,258, filed Sep. 14, 2018, both application of which are hereby incorporated by this reference in their entirety as if fully set forth herein.

BACKGROUND

Field

Embodiments of the present invention relate to methods for detecting time series anomalies.

Background

Time series are used in almost every field: intrusion and fraud detection, tracking key performance indicators (KPIs), the stock market, and medical sensor technologies, to name a few. Time series datasets are also being created at an unprecedented scale. One important use of time series is for the detection of anomalies for ensuring undisrupted business, efficient troubleshooting, or even, in the case of medical sensor technologies, lower the mortality rate. However, anomaly detection in time series is a difficult problem for a various of reasons:

An anomaly in a time series is a pattern that does not conform to past patterns of behavior in the series. What is defined as anomalous may differ based on application. A one-size-fits-all anomaly detection method that is optimal for all domains is virtually unheard of. In addition, inclusion of contextual variables may change initial perceptions of what is anomalous.

For example, suppose, on average, the number of daily bike rentals is 100, and one day, it was only 10. This initially may appear anomalous, but if it is a cold, winter day, this is actually not so surprising. In fact, it might appear even more anomalous if there were 100 rentals instead.

There are also different types of anomalies (e.g. point, contextual, and collective anomalies and some anomaly detection methods are better than others at detecting certain types of anomalies.

Anomaly detection often must be done on real-world streaming applications. In practice, an online anomaly detection method should determine anomalies and update all relevant models before occurrence of the next time step. Depending on the needs of the user, it may be acceptable to detect anomalies periodically. Regardless, efficient anomaly detection presents a challenge.

It is unrealistic to assume that anomaly detection systems will have access to thousands of tagged datasets. In addition, given the online requirement of many such systems, it can be easy to encounter anomalous (or not anomalous) behavior that was not present in the training set.

As an anomaly is a pattern that does not conform to past patterns of behavior, non-anomalous data tends to occur in much larger quantities than anomalous data. This can present a problem for a machine learning classifier approach to anomaly detection, as the classes are not represented equally. Thus, an accuracy measure might present excellent results, but the accuracy is only reflecting the unequal class distribution in the data (the accuracy paradox). For example, if there are 100 data points and only 2 anomalies, a classifier can deem every point as non-anomalous and achieve 98% accuracy.

Anomalies should be detected as accurately and efficiently as possible, while minimizing false positives to avoid alarm fatigue. Alarm fatigue can lead to a serious alert being overlooked and wasted time in checking for problems when there are none.

BRIEF SUMMARY OF THE DISCLOSURE

Because of difficulties inherent in time series anomaly detection, there is a need for a comparison method which can: demonstrate which anomaly detection methods are more promising given different types of time series characteristics; highlight the differences between several scoring methodologies (windowed F-scoring vs. Numenta Anomaly Benchmark scoring); provide a foundation for time benchmarks essential in an online setting, and reveal important omissions in the anomaly detection methods themselves. Accordingly, the present invention is directed to Framework for the Automated Determination of Classes and Anomaly Detection Methods for Time Series that obviates one or more of the problems due to limitations and disadvantages of the related art.

In accordance with the purpose(s) of this invention, as embodied and broadly described herein, this invention, in one aspect, relates to a method for automatically determining an anomaly detection method for use on a class of time series, that includes receiving at processor a plurality of datasets for each type of time series characteristic for a given time series, wherein each time series has been classified into one of a known class based on expected properties of the time series before receipt by the processor; filtering a set of possible detection methods based on the time series class; and evaluating the remaining detection methods on the given time series using the specific evaluation metric and selecting and returning a recommended anomaly detection method based on the specific evaluation metric.

In another aspect, the invention relates to a method for automatically determining an anomaly detection method for use on a class of time series, that includes receiving at processor a plurality of datasets for each type of time series characteristic for a given time series, wherein each dataset includes annotations indicating anomalies and each dataset has at least one time series characteristic; determining a type of anomaly in each dataset; applying a first anomaly detection method to the plurality of datasets and applying a second anomaly detection method to the plurality of datasets; evaluating results of the first anomaly detection method using one of an area under the curve analysis and an NAB score; evaluating results of the second anomaly detection method using one of an area under the curve analysis and an NAB score; and comparing results of the area under the curve analyses and the NAB scores for the first anomaly detection method and the second anomaly detection method, and selecting one of the first anomaly detection method and the second anomaly detection method for use with time series sharing characteristics with the given time series.

In yet another aspect, the invention relates a method of separating time series data into classes having similar attributes that includes receiving a sample time series of a given class, the sample time series having labels identifying anomalies in the time series; calculating a windowed F-score for each of a plurality of anomaly detection methods for the sample time series; and calculating a Numenta anomaly benchmark (NAB) score for each of the plurality of anomaly detection methods for the sample time series; and based on the windowed F-scores and the NAB scores, selecting one of the plurality of anomaly detections methods for application to any time series of the given class.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

An advantage of the present invention is to provide framework for the automated determination of classes and anomaly detection methods for time series.

Further embodiments, features, and advantages of the framework for the automated determination of classes and anomaly detection methods for time series, as well as the structure and operation of the various embodiments of the framework for the automated determination of classes and anomaly detection methods for time series, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate a framework for the automated determination of classes and anomaly detection methods for time. series together with the description, the figures further serve to explain the principles of the framework for the automated determination of classes and anomaly detection methods for time series described herein and thereby enable a person skilled in the pertinent art to make and use the framework for the automated determination of classes and anomaly detection methods for time series.

FIG. 9 is a table showing seasonality corpus F-scores for the nine different anomaly detection methods (columns) for various window sizes (rows).

FIG. 10 is a table showing seasonality corpus NAB scores for the nine different anomaly detection methods (columns) for various window sizes (rows).

FIG. 11 is a table showing trend corpus F-scores for the nine different anomaly detection methods (columns) for various window sizes (rows).

FIG. 12 is a table showing trend corpus NA scores for the nine different anomaly detection methods (columns) for various window sizes (rows).

FIG. 13 is a table of concept drift corpus F-scores for the nine different anomaly detection methods (columns) for various window sizes (rows).

FIG. 14 is a table showing concept drift NAB scores for the nine different anomaly detection methods (columns) for various window sizes (rows).

FIG. 15 is a table showing missing corpus F-scores for the nine different anomaly detection methods (columns) for various window sizes (rows).

FIG. 16 is a table of missing corpus NAB scores for the nine different anomaly detection methods (columns) for various window sizes (rows).

FIG. 19A illustrates predicted outliers according to F-score and true outliers for ec2_cpu_utilization_ac20cd time series under SARIMAX using concept drift thresholds.

FIG. 19B illustrate predicted outliers according to NAB score and true outliers for ec2_cpu_utilization_ac20cd time series under SARIMAX using concept drift thresholds.

DETAILED DESCRIPTION

Reference will now be made in detail to embodiments of the Framework for the Automated Determination of Classes and Anomaly Detection Methods for Time with reference to the accompanying figures. The same reference numbers in different drawings may identify the same or similar elements.

Presented herein are guidelines for automating the classification of time series and choice of anomaly detection method based on the characteristics the time series possesses.

Time Series Characteristics may include non-stationarity, seasonality, concept drift, trend, sampling rate, missing time steps, as discussed in more detail below.

Figure 1A:
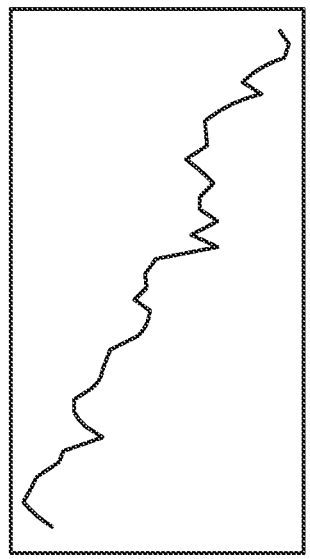
FIG. 1A illustrates an example of a non-stationary time series exhibiting seasonality.
Figure 1B:
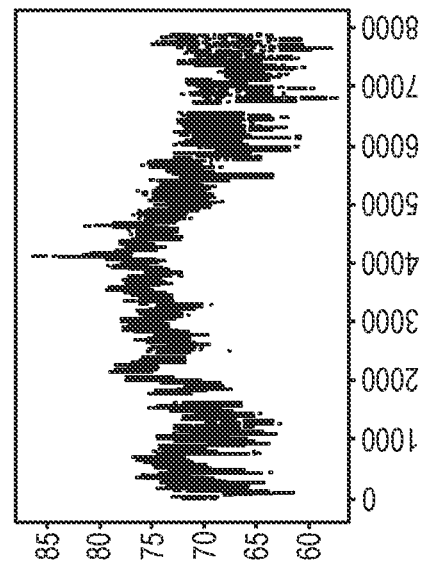
FIG. 1B illustrates an example of a non-stationary time series exhibiting a downward trend.
Figure 1C:
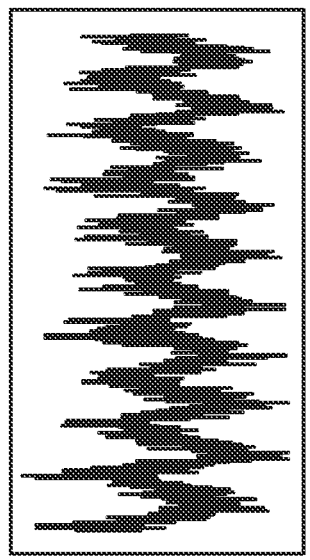
FIG. 1C illustrates an example of a non-stationary time series displaying concept drift.
Figure 1D:
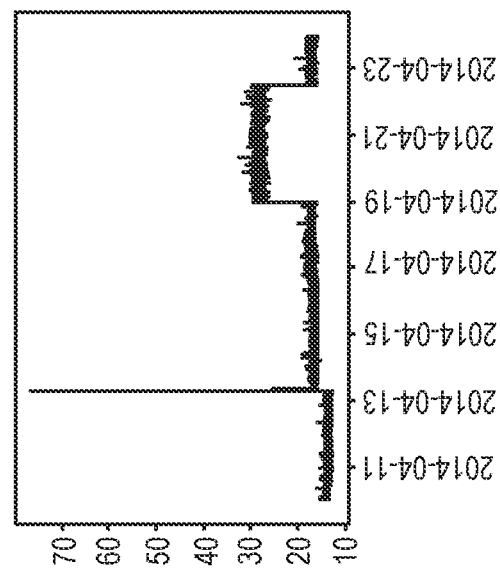
FIG. 1D illustrates an example of a time series with missing time steps.

FIG. 1A illustrates an example of a non-stationary time series exhibiting seasonality. FIG. 1B illustrates an example of a non-stationary time series exhibiting a downward trend. FIG. 1C illustrates an example of a non-stationary time series displaying concept drift around 201404-19 and 2014-04-23. Another concept drift occurs around 2014-04-13 shortly after an anomalous spike. FIG. 1D illustrates an example of a time series with missing time steps. The time series is displayed as a scatter plot to showcase the missing points, especially around time step 6500.

Stationarity A time series is stationary if the mean, variance, and autocorrelation structure are constant for all time t. A white noise process is stationary, for example. Some definitions do not require a constant autocorrelation structure. Many anomaly detection methods require a time series to be made stationary first as a preprocessing step. A strictly stationary process would expect all moments of all degrees to be constant. Note, however, that we use the weak (otherwise known as 2nd order) definition of stationarity, as it is often not possible to expect a time series to be strictly stationary in real-world scenarios (Nason 2006). Most time series encountered in the real world are not stationary.

Non-stationarity Non-stationary time series may exhibit seasonal behavior (see FIG. 1*a*. For example, it is likely that there are more bike rentals in the summer and fewer in the winter. Seasonality can be additive or multiplicative. In the latter case, the amplitude of the seasonal behavior is related to the level (mean) of the data. Other behaviors that may be exhibited by nonstationary time series include trend (see FIG. 1*b*) and concept drift (see FIG. 1*c*) where the definition of normal behavior changes over time. Initially, a concept drift may trigger an anomaly, but an adaptive system may determine that a new pattern of behavior has occurred and is the new "normal".

Sampling Rate An online anomaly detection method may require that anomalies be determined and models be updated before occurrence of the next time step or some potentially larger time frame as specified by the user. In cases where anomaly detection is done online, the sampling rate can restrict the kinds of anomaly detection methods under consideration.

Missing Time Steps Missing time steps may occur in time series due to imperfect sensors and are a frequent occurrence in real-world datasets (see FIG. 1D). A sensor may break down, and several time steps' worth of data may be lost. Missing time steps may make it difficult to apply anomaly detection methods without some form of interpolation. However, other methods can handle missing time steps innately.

Detection of Time Series Characteristics: Although some of the characteristics discussed are easy to determine at a glance, it can be more difficult to determine if a time series is stationary in an automated fashion. Naively, one could partition the dataset and compare summary statistics of every partition. But it can be cumbersome to determine the location and sizes of these partitions; one partitioning scheme can reveal differences while another may suggest constant mean and variance. Several statistical tests may be used to detect time series characteristics.

Detecting Trend: A first step for determining stationarity is conducting an Augmented Dickey-Fuller test, a statistical unit root test that can determine how strongly a time series is defined by a trend. The null hypothesis is that a stochastic trend (unit root) exists, and the alternative hypothesis is that no such trend exists. If the p-value is below a user-defined threshold, the data exhibits no trend. If the p-value is above the threshold, this does not necessarily mean the null hypothesis is true, but we can say that the data does not conclusively demonstrate that the null hypothesis is false.

Figure 2A:
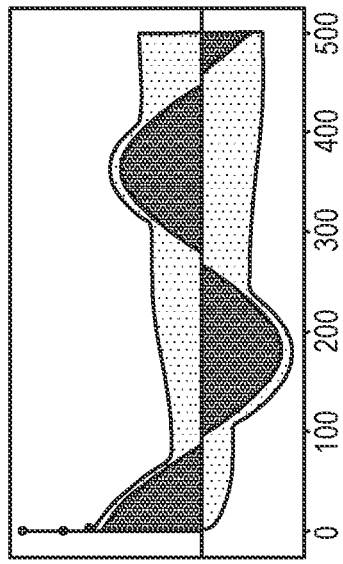
FIG. 2A illustrates a time series displaying seasonal behavior.
Figure 2B:
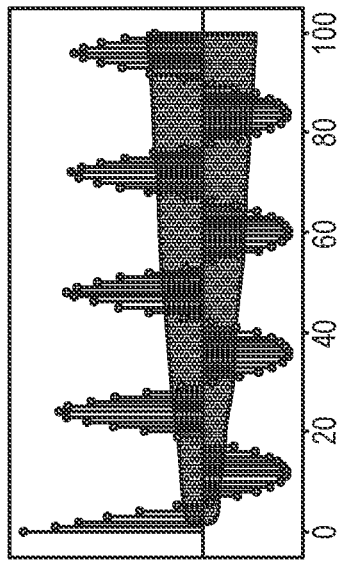
FIG. 2B illustrates an autocorrelation function associated with the time series of FIG. 2A.
Figure 2C:
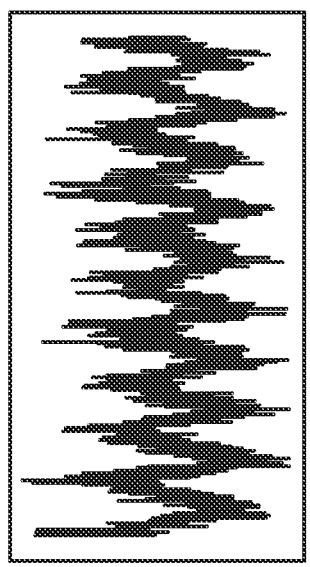
FIG. 2C illustrates a time series with unobvious seasonality.
Figure 2D:
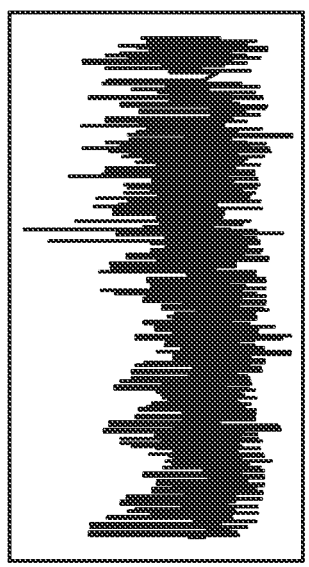
FIG. 2D illustrates an autocorrelation function associated with the time series of FIG. 2C.
Figure 3B:
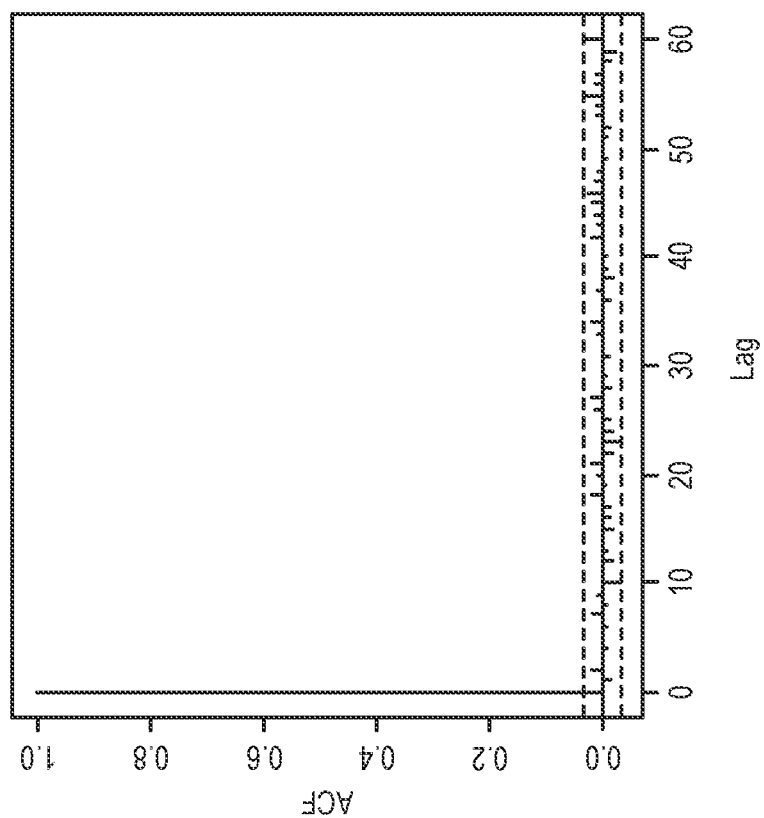
FIG. 3B illustrates an autocorrelation function of a times series without seasonality.
Figure 3A:
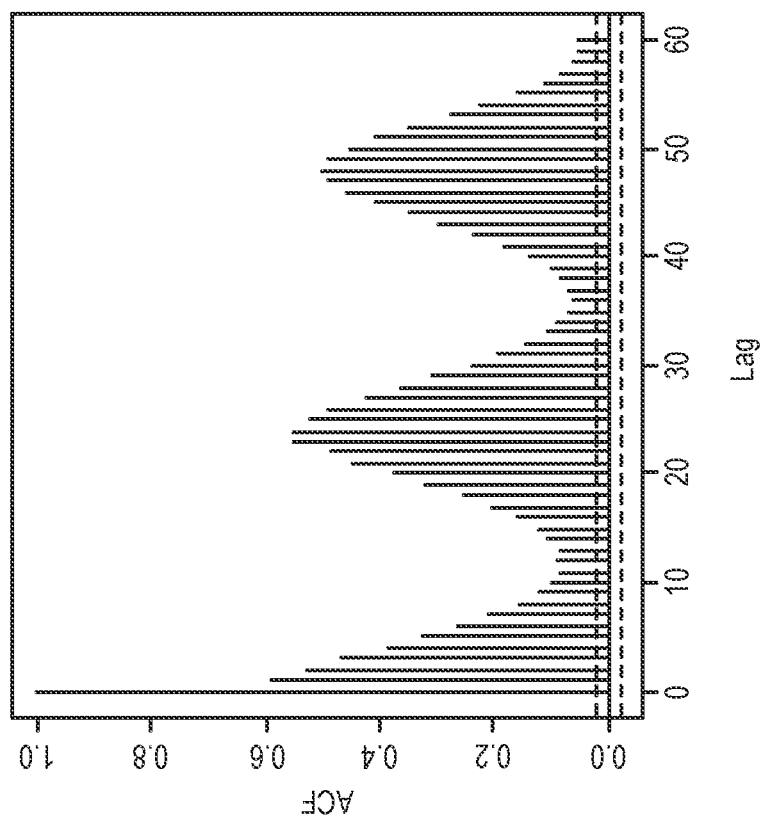
FIG. 3A illustrates an autocorrelation function of a time series with seasonality.

Detecting Seasonality: An Augmented Dickey-Fuller test is not built to determine if seasonality is present in the time series. Although seasonality can sometimes be determined at a glance (see FIG. 2A), other times it is not so obvious (see FIG. 2C). The autocorrelation plot (ACF, also known as a correlogram) which displays the correlation for time series observations with its lags (observations from previous time steps) may be analyzed. FIG. 2A illustrates a time Series with obvious seasonality. FIG. 2B illustrates an autocorrelation function associated with the time series of FIG. 2A. FIG. 2C illustrates a time Series with seasonality determined by analysis of the ACF. FIG. 2D illustrates an autocorrelation function associated with the time series of FIG. 2C. FIGS. 2A and 2B were generated using Pandas, with the confidence interval represented as a blue cone. A time series that exhibits seasonality will show a repetitive pattern in its autocorrelation plot like in FIG. 3A. FIG. 3A illustrates an ACF of a non-stationary time series displaying daily seasonality. Similar behavior occurs once every 24 time steps where each time step is 1 hour. FIG. 3B illustrates an ACF of a stationary time series without seasonality which shows exponential decay. The x-axis shows the lag value. The y-axis shows the Pearson correlation. This correlation coefficient is between −1 and 1 and describes a negative or positive correlation, respectively. A value of zero indicates no correlation. The dashed line represents the 95% confidence interval. Values outside of this dashed line are very likely a correlation and not a statistical fluke. For example, in FIG. 3B, the time series does not contain seasonality. FIGS. 3A and 3B were generated using stats in R, with the confidence interval represented as the dashed, blue line. The reason for the difference in display of confidence intervals is that Pandas takes into account the fact that time series values that are close in time would be more highly correlated than ones that are more far apart. The ACF should tend to zero the farther out in lags. The Pandas confidence interval is also taking this into account by becoming fatter the farther out in lags you go (less likely to have significant correlations).

After analyzing an ACF plot, one could consider using a Ljung-Box test to determine if the time series model resembles white noise. The Ljung-Box test is based on the e statistic:

$$Q^* = T(T+2) \sum_{k=1}^{h} (T-k)^{-1} r_k^2$$

where T is the time series length, $r_k$ is the kth autocorrelation coefficient, and h is the number of lags to test. It is suggested in Hyndman RJ, Athanasopoulos G (2018) Forecasting: principles and practice. OTexts (Hyndman and Athanasopoulos 2018) to use h=10 for nonseasonal time series and h=2 p where p is the periodicity. For example, in FIG. 3A, the periodicity is 24.

If Q*is large, this suggests that there are significant autocorrelations, and non-stationarity is present. More specifically, if Q*is larger than the 1−α quantile of the chi-squared distribution with h degrees of freedom where α is the significance level. The null hypothesis is that autocorrelations up to a number of lags are equal to 0 (the data values are independent). The alternative hypothesis is that there is dependence between the values. If the p-value is below a user-defined threshold, the data exhibits dependency. Once again, however, if the p-value is above the threshold, this does not necessarily mean the null hypothesis is true; independence in time series cannot be explicitly tested for.

Figure 4:
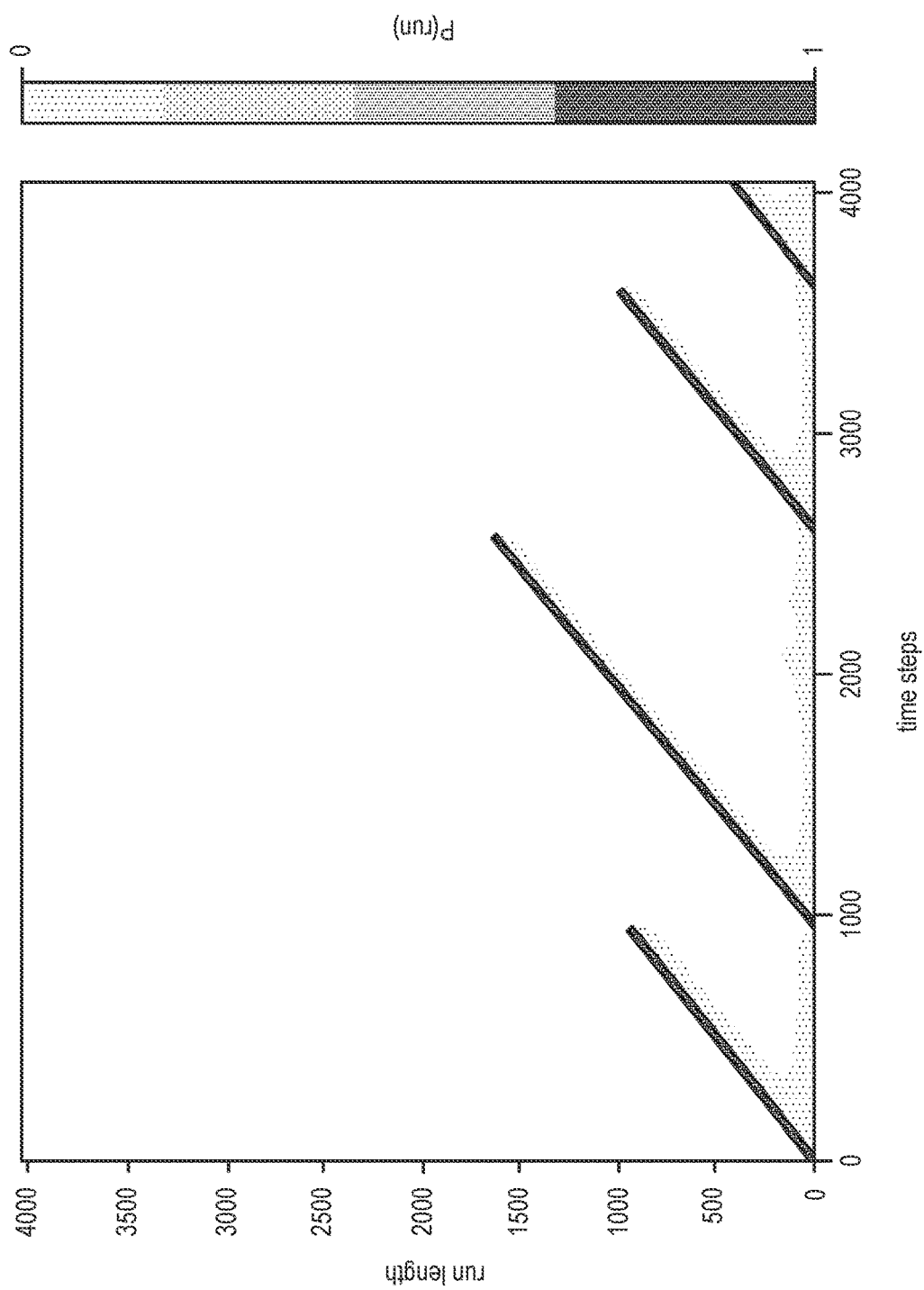
FIG. 4 shows the posterior probability of the run length at each time step using a logarithmic color scale.

Using the same time series in FIG. 1C, FIG. 4 shows the posterior probability of the run length at each time step using a logarithmic color scale.

Detecting Concept Drift Concept drifts may be difficult to detect especially if one does not know beforehand how many concept drifts there are. However, this number does not need to be known. An implementation can be performed using t-distributions for each new concept, referred to as a run. The posterior probability ($P(r_t|x_{l:t})$) of the current run $r_t$'s length at each time step ($x_i$ for i=1 . . . t) can be displayed, using a logarithmic color scale (see FIG. 4). Although the number of concept drifts need not be known beforehand, Adam's method is memoryless; if a change point has occurred with high probability, the previous distribution's parameters are not used in determining the next distribution's parameters. A MAP (maximum a posteriori) estimate at each time step can be used in an offline setting.

Example Datasets

According to principles described herein, we provide example datasets for the time series characteristics discussed above. In this example, there are 10 datasets for every characteristic as determined by using the techniques discussed in subsection 2.2. Thus, every characteristic has a corpus of 10 datasets. Some datasets exhibit multiple such characteristics.

Some of the datasets we use come from the Numenta Anomaly Bench mark repository, which includes 58 pre-annotated datasets across a wide variety of domains and scripts for evaluating online anomaly detection algorithms. No multivariate datasets are provided in Numenta's repository. Meticulous annotation instructions for Numenta's datasets are available in Anomaly labeling instructions. https://drive.google.com/file/d/0B1 XUjaAXeV3YlgwRXdsb3 Voalk/view (Numenta 2017) and Lavin A, Ahmad S (Lavin and Ahmad 2015b) The Numenta anomaly benchmark (white paper). https://github.com/NAB/wiki. The Numenta Anomaly Benchmark repository also contains code for combining labels from multiple annotators to obtain ground truth. For every such annotated dataset, there is a probationary period (first 15% of the dataset) where models are allowed to learn normal patterns of behavior. For this reason, no anomalies are labeled in the probationary period. Plots of the datasets used herein include a vertical dividing line to display the location of the probationary period.

In cases where we do not use Numenta datasets, the datasets were manually tagged for anomalies following the Numenta instructions. There are also several instances where outliers were injected. We proceed with briefly describing the datasets making up our corpi. A summary of all datasets in available in Table 1. The type of anomalies present in each dataset was also determined: e.g., point or collective. A data point is considered a point anomaly if its value is far outside the entirety of the data set. A subset of data points within a data set is considered a collective anomaly if those values as a collection deviate significantly from the entire data set, but the values of the individual data points are not themselves anomalous. The first point in the subset is marked by Numenta. Note that anomalies can also be contextual. A data point is considered a contextual outlier if its value deviates from the rest of the data points in the same context. However, as univariate datasets are considered in this example, no contextual outliers are shown in Table 1. Out of a total of 21 datasets, 16 contain anomalies that are point anomalies, and 9 contain collective anomalies. Some datasets exhibit both types of anomalies.

Exchange_2_cpm_results, exchange_3_cpm_results: exchange-2 cpm results and exchange-3 cpm results are an online advertisement's cost per thousand impressions (CPM). CPM is a marketing term referring to the cost (as charged by the website publisher to the advertiser) of having 1000 customers view an advertisement. One duplicate record was found on Aug. 24, 2011 for exchange-2 cpm results; one of the two values was arbitrarily chosen.

Exchange_2_cpc_results, exchange_3_cpc_results: These datasets are similar to those in exchange-2 cpm results, exchange-3 cpm results, except they track the CPC, or cost-per-clicks (as charged by the website publisher to the advertiser), instead of the CPM.

Elb_request_count_8c0756 includes request counts for Amazon Web Services' Elastic Load Balancer which distributes application traffic. There are approximately 2 weeks' worth of data in 5 minute intervals, 8 missing time steps, and 2 annotated outliers.

Figure 18A:
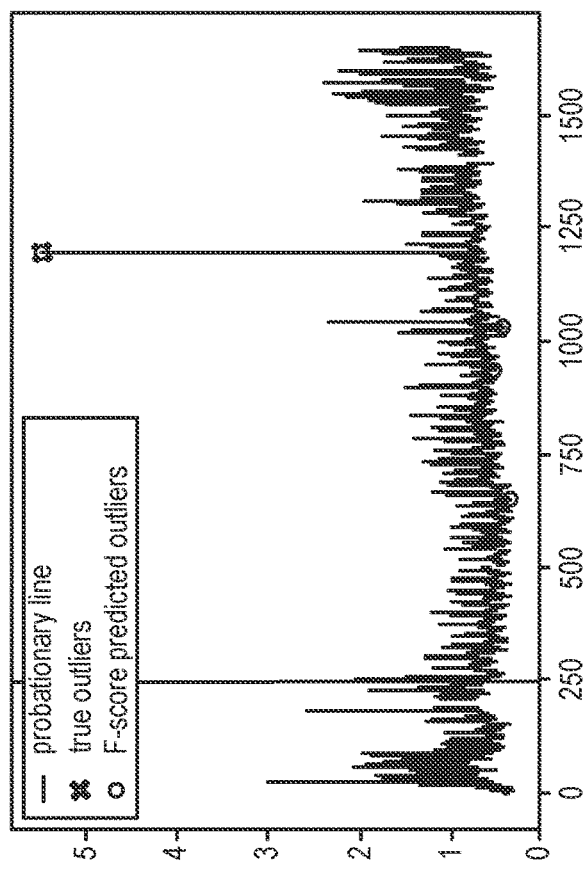
FIGS. 18A and 18B show outliers as determined from NAB in different window sizes.
Figure 18B:
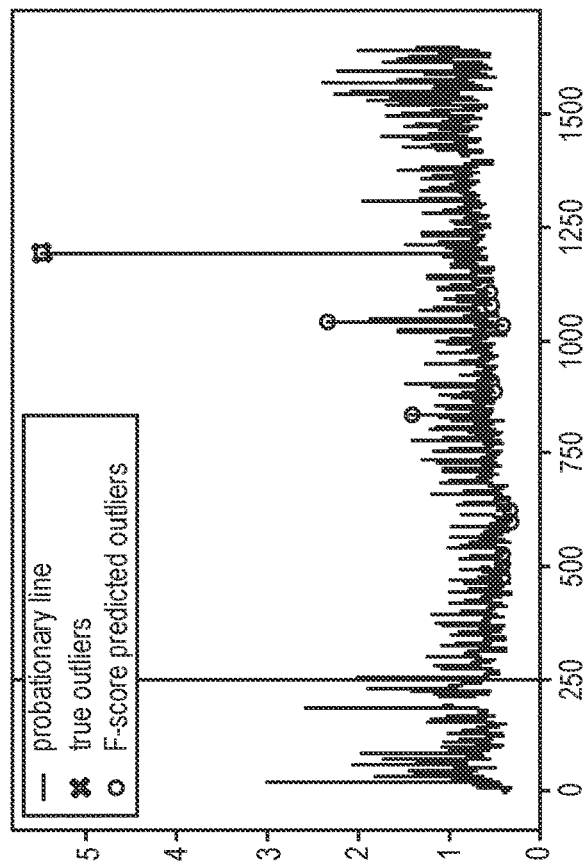

Nyc_taxi anomaly causes are known beforehand; thus, there was no hand labeling by Numenta. This dataset includes the number of New York City taxi passengers over the course of approximately 6 months in 30 minute time steps. There are no missing time steps in this dataset. There are 5 anomalies corresponding to special events: a marathon, Thanksgiving, Christmas, New Year's Day, and a snow storm.

grok_asg_anomaly includes auto scaling group grok metrics over the course of approximately half a month in 5 minute intervals. An auto scaling group is a similar collection of Amazon Elastic Compute Cloud instances, and Grok is used to monitor patterns in environments and identify unusual behaviors. rds_cpu_utilization_cc0c53 and rds_cpu_utilization_e47b3b include CPU utilization metrics for Amazon Web Services' Relational Database Service (RDS) over the course of 2 weeks in 5 minute time step intervals. cc0c53 has 1 missing time step. cc0c53 and e47b3b both have 2 annotated anomalies, ambient_temperature_systemfailure includes hourly ambient temperatures in an office setting over the course of approximately a year. Similar to nyc taxi, there is no hand-labeling for this dataset as anomaly causes are known (although these causes are not explained in detail in Numenta anomaly benchmark. https://github.com/numenta/NAB (Numenta 2018b) There are 621 missing time steps and 2 anomalies out of 7267 total time steps.

art_dailyjlat_middle, art_daily_nojump are artificially-generated data with varying types of anomalies. Although not explicitly stated, they contain examples of collective anomalies. A collective anomaly is a group of data instances that are anomalous with respect to the entire dataset. Individually, these data instances may not be anomalous. A data point around time step 3000 in FIGS. 18A and 18B is not anomalous by itself; a value around 0 to 20 is quite common. But data points stay in that range for a longer than expected period of time. Together, these data points are a collective anomaly.

ec2_cpu_utilization_5f5533, ac20cd track CPU usage data from a server in Amazon's East Coast datacenter. They end with complete system failures resulting from a documented failure of AWS API servers. This dataset involves the hourly counts of a specific intent being hit in conversations with an Intelligent Virtual Assistant (IVA) for an airlines company. An intent is the interpretation of the statement or question that allows one to formulate the best response. Intents can be thought of as labels in a classification task. As an example, if a user asked if he could bring his dog with him on a plane flight, the user intent would be "travel policy with pets". The dataset in question counts the number of times the intent "Gift Certificates" was hit over the year of 2016. Anomalies were annotated using Numenta's instructions; there were 3 such anomalies past the probationary period. See FIG. 5A.

Figure 5B:
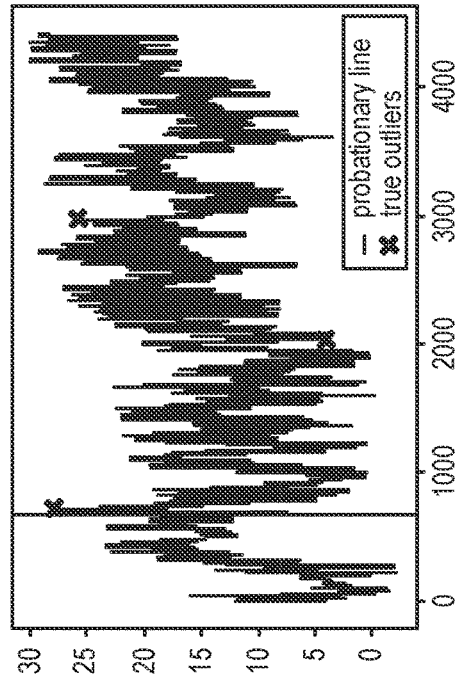
FIGS. 5A, 5B and 5C illustrate hourly counts of a specific intent being hit in conversations with an Intelligent Virtual Assistant (IVA) for an airlines company.
Figure 5C:
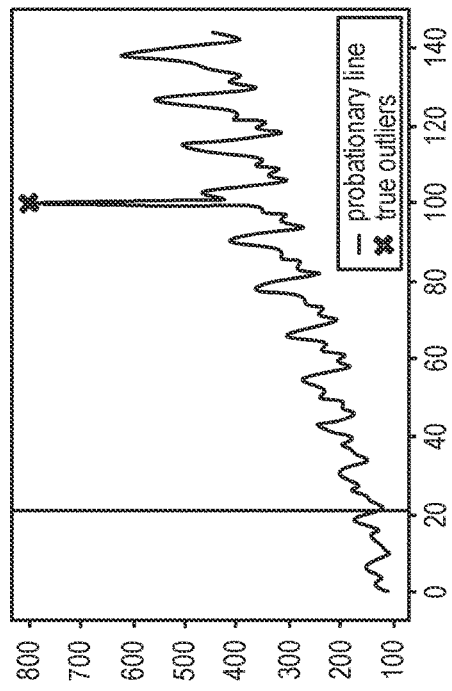
Figure 5A:
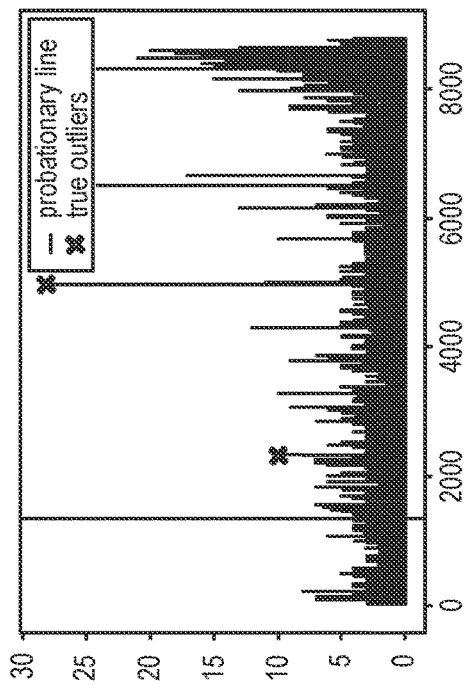

FIGS. 5A, 5B and 5C illustrate hourly counts of a specific intent being hit in conversations with an Intelligent Virtual Assistant (IVA) for an airlines company. There are three annotated outliers (x's) illustrated in FIG. 5A. FIG. 5B illustrates air temperature measurements in Bowling Green, Ky. resampled to 30 minute time steps. FIG. 5C illustrates monthly totals in thousands of international airline passengers. FARM Bowling-Green-5-S Warren dataset includes air temperature measurements in Bowling Green, Ky. There are 3 months' worth of data in 30 minute intervals. Originally, the dataset was collected in 5 minute time intervals, but we chose to resample the data into 30 minute time intervals using the mean so as to investigate a variety of time series with different time steps. Under the 5 minute time step system, 19 data points were missing, and linear interpolation was used before switching to 30 minute time steps. Thus, the version used has no missing data points. 3 anomalies were annotated (tagged after resampling) using Numenta's instructions. FIG. 5B displays the results of annotation.

Ibm_common_stock_closing_prices contains the daily stock closing prices for IBM from 1962 to 1965. There is no weekend data, giving us approximately 450 missing data points. There is 1 annotated anomaly.

international-airline-passengers contains the monthly totals in thousands of international airline passengers from January 1949 to December 1960, and one outlier is artificially injected (see FIG. 5C).

As we want 10 datasets for every characteristic, three concept drift datasets are also artificially generated (artificial cd dataset 1,2,3) by combining lists containing values chosen using Python's random uniform function at varying intervals. Anomalies are chosen based on the starting location of the change points.

For seasonality, trend, and concept drift corpi of datasets, any missing time steps are filled using linear interpolation. For the missing time step characteristic corpus, either datasets with missing time steps already were chosen or data points from datasets with originally no missing points were removed to generate the corpus, e.g., for nyc_taxi, artificial_cd_dataset_1,3, only. See Table 1 for a summary of all datasets.

Table 1 shows a summary of all datasets. In general, these statistics were gathered before any interpolation was done on the main variable. Step is the time step size, Min is the minimum, Max is the maximum, # Anom is the number of anomalies in the dataset, Outlier Type is whether or not the outliers the dataset contains are point (P) and/or collective (C), and # Miss is the number of missing time steps in the dataset. If there is a parenthesis in the missing column, that means that the dataset originally did not have missing data points, but we created another version of this dataset with points randomly removed for the missing time step corpus. A dataset will have a value of Y in the Numenta column if it was collected from the Numenta repository. Otherwise, it is N. "Corpus" lists which characteristic corpus the dataset belongs to. Note that because we want 10 datasets per characteristic, some datasets may exhibit a characteristic but not be placed in that corpus (e.g. elb request count 8c0756 has missing time steps but is not used in the missing time steps corpus). Some datasets may belong to multiple corpi (e.g. exchange-2 cpm results belongs to the seasonality, trend, and missing time steps corpi). If there is seasonality, we include the number of time steps per period is included in parenthesis.

TABLE 1

| Dataset | Length | Step | Min | Max | Median | Mean | # Anom | Outlier Type | # Miss | Numenta | Corpus |
|---|---|---|---|---|---|---|---|---|---|---|---|
| exchange_2_cpm_results | 1624 | 1 hr | 0 | 1.051 | 0.295 | 0.337 | 2 | P | 25 | Y | seasonal (24), trend miss |
| elb_request_count_8c0756 | 4032 | 5 min | 1 | 656 | 48 | 61.837 | 2 | P | 8 | Y | seasonal (288) |
| nyc_taxi | 10320 | 30 min | 8 | 39197 | 16778 | 15137.569 | 5 | P, C | 0 (9) | Y | seasonal (48), miss |
| all_data_gift_certificates | 8784 | 1 hr | 0 | 28 | 0 | 0.954 | 3 | P, C | 0 | N | seasonal (24), trend |
| FARM_Bowling-Green-5-S_Warren | 26465 | 30 min | −2.490 | 30.304 | 15.455 | 14.830 | 3 | P, C | 0 | N | seasonal (48) |
| grok_asg_anomaly | 4621 | 5 min | 0 | 45.623 | 33.445 | 27.685 | 3 | P | 1 | Y | concept drift |
| rds_cpu_utilization_cc0c53 | 4032 | 5 min | 5.190 | 25.103 | 6.082 | 8.112 | 2 | P | 0 | Y | concept drift, miss |
| rds_cpu_utilization_e47b3b | 4032 | 5 min | 12.628 | 76.230 | 16.678 | 18.935 | 2 | P | 621 | Y | concept drift |
| ambient_temperature_system_failure | 7267 | 1 hr | 57.458 | 86.233 | 71.858 | 71.242 | 2 | P | 0 | Y | trend, seasonal (24), miss |
| art_daily_flat_middle | 4021 | 5 min | −21.999 | 87.958 | −17.541 | 18.981 | 1 | C | 0 | Y | concept drift |
| ec2_cpu_utilization_5f5533 | 4032 | 5 min | 34.766 | 68.092 | 42.918 | 43.110 | 2 | P | 5 | Y | concept drift, trend |
| ec2_cpu_utilization_ac20cd | 4032 | 5 min | 2.464 | 99.742 | 34.662 | 40.985 | 1 | P | 0 | Y | concept drift, trend miss |
| art_daily_nojump | 4032 | 5 min | 18.001 | 87.973 | 21.382 | 40.818 | 1 | C | 0 | Y | concept drift |
| artificial_cd_dataset_1 | 800 | 5 min | 1.008 | 19.973 | 9.986 | 10.110 | 3 | C | 0 (4) | N | concept drift, miss |
| artificial_cd_dataset_2 | 1800 | 5 min | 1.004 | 59.935 | 11.174 | 15.282 | 8 | P, C | 0 | N | concept drift |

TABLE 1-continued

| Dataset | Length | Step | Min | Max | Median | Mean | # Anom | Outlier Type | # Miss | Numenta | Corpus |
|---|---|---|---|---|---|---|---|---|---|---|---|
| artificial_cd_dataset_3 | 1000 | 5 min | 1.042 | 49.952 | 25.138 | 25.189 | 4 | P | 0 (3) | N | concept drift, miss |
| exchange_3_cpm_results | 1538 | 1 hr | .321 | 5.498 | .695 | .773 | 1 | P | 109 | Y | trend, seasonal (24), miss |
| exchange_2_cpc_results | 1624 | 1 hr | .027 | .227 | .101 | .102 | 1 | C | 25 | Y | trend, seasonal (24), miss |
| exchange_3_cpc_results | 1538 | 1 hr | .039 | 1.034 | .118 | .137 | 3 | P | 109 | Y | trend, seasonal (24) |
| international-airline-passengers | 144 | 1 month | 104 | 800 | 265.5 | 283.389 | 1 | P | 0 | N | trend, seasonal (12) |
| ibm-common-stock-closing-prices | 1008 | 1 day | 306 | 598.50 | 460.625 | 462.818 | 1 | C | 452 | N | trend, miss |

Serving as a baseline, the windowed Gaussian method is a sliding window anomaly detector that determines anomaly scores of data points in the time series by computing their probabilities from the Gaussian distribution over a window of previous data points. See Numenta 2018b for implementation details. The parameters for consideration are window size and step size (for when to slide) and are determined via grid search. More details on parameter selection are provided below.

ARMA models are tools for understanding and forecasting future values by regressing the variable on its own past values (AutoRegressive) and modeling the error term as a linear combination of current and past error terms (Moving Average). By differencing between current and past values, the time series can potentially be made stationary (Integrated). If seasonality is incorporated, the model becomes SARIMA (Seasonal AutoRegressive Integrated Moving Average) model. If exogenous variables are included, the model is a SARIMAX model.

The predictors depend on the parameters (p, d, q) (P, D, Q, s) of the SARIMAX model. The number of AR terms are the lags (p). For example, if p is 5, the predictors for $p_t$ are $p_{t-1}, p_{t-2}, \ldots p_{t-5}$. The number of MA terms are the lagged forecast errors (q). If q is 5, the predictors for $p_t$ are $e_{t-1}, e_{t-2}, \ldots e_{t-5}$ where every $e_i$ is the difference between the actual value and the moving average at the ith step. d is the differencing parameter. If d=1, we take the difference of every observation with that of a direct, previous observation. Differencing is a method to deal with trend in time series. P, D, Q are very similar to p, d, q except we now consider the seasonal versions of the autoregressive component, moving average component, and difference given the length of the season s (number of time steps in each season).

Much manual analysis can be used in choosing the parameters for a SARIMAX model. We cannot expect this of a non-expert user.

Thus, there are libraries that can automatically determine hyperparameters (e.g. Pyramid in Python and auto.arima in R) according to a given information criterion (e.g. Akaike Information Criterion (AIC), Bayesian Information Criterion (BIC), etc.). The stepwise algorithm is faster than a traditional grid search and less likely to overfit. However, for long time series with seasonality and even using the stepwise algorithm, this can still be a very slow and memory intensive process.

To apply the SARIMAX model for anomaly detection, the following example procedure was followed: (1) The length of the seasonal cycle is chosen according to the ACF. (2) auto.arima is applied to the probationary period data to select the optimal model order. This process may choose a non-seasonal model in spite of any pre-specified periodicity. (3) A maximum likelihood fit is applied to the probationary period to obtain initial parameters. (4) The maximum likelihood parameters are used to initialize a Kalman Filter8, which is then applied to the full time series. (5) The residuals of the Kalman Filter predictions are fed to the windowed Gaussian detector to obtain normalized anomaly scores.

Exogeneous variables are also included. We encode seasonal variation due to hour-of-day, day-of-week, day-of-month, and month-of-year using binary indicators. A subset of the aforementioned regressors are selected as appropriate for the scale of the time series.

Facebook Prophet is an additive regression model that begins with a special time series decomposition method involving a piecewise linear or logistic growth curve trend (g(t)), a yearly seasonal component modeled using Fourier series or a weekly seasonal component (s(t)), and a user provided list of holidays (h(t)):

$$y(t)=g(t)+s(t)+h(t)+E_t$$

$E_t$ is the error term and is assumed to be normally distributed. A key difference between what Prophet does compared to other techniques such as ARIMA is that it formulates this problem as a curve-fitting exercise.

Prophet can automatically detect changes in trends by selecting change points between concept drifts although a sensitivity parameter (prior scale) must be tuned. The user can also implement custom change points if desired. However, that does require knowing where change points are beforehand. Prophet may be trained on the entire dataset to take advantage of this automatic changepoint detection and use grid search to determine the sensitivity parameter. Prophet can also innately handle missing time steps. Prophet was originally designed with daily time steps in mind. Although adjustments have been made to deal with sub-day time steps, time steps larger than a day can have unexpected behaviors. Prophet uses Stan to determine parameters using maximum a posteriori (MAP) optimization and is available in R and Python. Kalman filters produce estimates of unknown variables observed over time where these estimates are weighted by uncertainties around each point.

Seasonal and trend decomposition using LOESS (STL) is a preprocessing step in making non-stationary time series stationary. STL decomposes a time series into three components: seasonality, trend, and remainder. STL includes an inner loop that determines these 3 components and an outer loop that increases robustness against anomalies. Trend is determined using a moving average filter. After removing trend from the data, the time series is partitioned into cycle subseries. For example, if there is yearly seasonality and the time series has monthly time steps, there will be 12 cycle subseries where all January time steps form a time series, all February time steps form another time series, etc. These cycle subseries are then smoothed using LOESS (local regression) which helps provide a smooth estimate of the time series for all time steps; this means that STL can innately deal with missing time step gaps. STL is parameter-heavy, with the parameters' periodicity of the seasonality ($n_{(p)}$) and the smoothing parameter for the seasonal filter ($n_{(s)}$) having importance. The cycle subseries becomes smoother the larger $n_{(s)}$ is. If the seasonal pattern is constant over time, $n_{(s)}$ should be set to a larger value. If the seasonal pattern, instead, changes quickly, $n_{(s)}$ should be reduced.

We follow the given anomaly detection methods in this section exactly; if STL is not mentioned, we do not apply it on the entire time series as a preprocessing step. We use the stlplus package. stlplus allows for missing data (as opposed to R's stl (Belzile 2018)) and gives access to more parameters (compared to Python's seasonal decompose function in StatsModels in Seabold S, Perktold J (2010) Statsmodels: Econometric and statistical modeling with python. In: Proceedings of the 9th Python in Science Conference, SciPy society Austin, vol 57, p 61. See Marchezini GF (2017) Handling nan values. https://github.com/hafen/stlplus/issues/2 for information on how stlplus handles missing time steps.

The result of STL can be used for outlier detection; for example, the remainder component is thresholded to determine outliers. Although stlplus can handle missing time steps, the data frame that is output (which may include every component of the decomposition) will still have missing time steps. Thus, if necessary, we use R's imputeTS library Moritz S (2018) imputets. https://github.com/SteffenMoritz/.imputeTs (Moritz 2018) on the remainder component as this is needed for several anomaly detection methods that use the results of STL and do not expect missing time steps. imputeTS allows for multiple forms of interpolation: linear, spline, and Stineman interpolation.

Twitter released the open-source R package, AnomalyDetection, which detects anomalies using edited versions of the extreme studentized deviate test (ESD). First, the entire time series is made stationary by applying a modified STL decomposition where the median of the time series is used to represent the trend component.

The residuals are then fed to median-based versions of the extreme studentized deviate test to detect anomalies. The traditional ESD test statistic is calculated like so: where k is the upper bound on the number of anomalies, is the mean, s is the $$C_k = \frac{\max_k |x_k - \bar{x}|}{s}$$

standard deviation, and $C_k$ is calculated for the k most extreme values in the dataset.

For the ESD test statistic median and MAD (median of the absolute deviations from the sample median) are used in the present example to compute the test statistic. Twitter provides that anomalies are point-in-time anomalous data points whereas concept drifts (or breakouts) "ramp up from one steady state to another". Twitter also released the BreakoutDetection library that may help determine when a new concept has occurred. One possible idea is to apply breakout detection first, and, for every new concept, apply Twitter's AnomalyDetection library. However, to the best of our knowledge, the two libraries, BreakoutDetection and AnomalyDetection, have never been used together in such a fashion. More specifically, we found no existing literature that makes use of both libraries on the same dataset.

A downside of using ESD is that an upper bound on the number of anomalies must be specified, otherwise ESD will assume that up to half of the data can be anomalous.

There are also several kinds of anomalies that Twitter AnomalyDetection has been reported to miss such as negative seasonal and flat signal anomalies.

There are two versions of Twitter AnomalyDetection: AnomalyDetection Vec (AD VEC) and AnomalyDetection Ts (AD TS). AD TS makes assumptions on the time step sizes, only allowing 1 minute, 1 hour, and 1 day time step sizes. A time series with 30 minute time step sizes must be resampled before using AD TS or it will error out. From there, AD TS will then choose a seasonality period automatically. ADVEC does not make such restrictive assumptions but requires a periodicity parameter be given that is larger than 1, barring any non-seasonal dataset from being used.

Although STL is used initially as a preprocessing step, if there are missing time steps, the Twitter AD library on will error out and suggest using interpolation. This is because Twitter AD uses R's stl instead of stlplus.

HOT-SAX is an algorithm for finding discords, or maximally different sub-series within a time series. A brute force algorithm for finding the maximally different time series compares the all-pairs distances, HOTSAX uses heuristics based on a Symbolic Aggregate approximation (SAX) representation for the time series to order the comparisons so that most of the distance evaluations can be skipped.

Using HOT-SAX implementation, what is returned is not an index for anomaly occurrence, but an index for the start of a subsequence that is different from the rest of the subsequences in the time series.

In SAX, an entire time series is broken down into equal-sized frames, and the mean of each frame is determined to create a lower dimensional vector representation called the piecewise aggregate approximation (PAA). Every PAA coefficient is compared to breakpoints (which produce areas under a Gaussian curve of equal sizes) in order to map coefficients to symbols in the alphabet.

Although only one parameter may be needed for HOT-SAX (the length of the subsequence), there are considerably more parameters that can be into consideration such as the upper bound on anomalies, alphabet size, and piecewise aggregate approximation size which can affect efficiency. In addition, time series discords are not built for change point detection. Anomaly detection may be considered a different problem from change point detection. This methodology has also not yet been extended to multivariate data, and despite the speedups compared to past brute force methods, can still be inefficient for very large time series. If the subsequences do not follow a Gaussian distribution closely, this can also affect the efficiency of the algorithm. The necessity of generating symbols (which may require looking at the entire time series beforehand) prior to anomaly detection may discourage this method from being considered in many online settings.

As an alternative to the SARIMAX model, we consider an online structured time series model encoding seasonal variation due to hour-of-day, day-of-week, day of-month, and month-of-year using binary indicators. A subset of the aforementioned regressors are selected as appropriate for the scale of the time series.

The model is made adaptive using the Recursive Least Squares (RLS) algorithm. The algorithm is further modified to enable the use of a Poisson distribution for the observations, which may be more appropriate for some count-valued datasets that are not well-approximated with a Gaussian. The choice of a Gaussian or Poisson output distribution is determined for each dataset based on domain knowledge.

In the Gaussian case, this method differs from the SARIMAX model by the introduction of a tunable exponential weighting factor, $\lambda$, that controls how rapidly the influence of past observations decays. We further extend the RLS algorithm with an additional step-size parameter $\eta$, which aids with stability on some datasets.

The residuals from the one-step-ahead prediction are fed to the windowed Gaussian detector to obtain normalized anomaly scores.

We also considered the R library, Anomalous, which is a feature-based anomaly detection method. Anomalous determines anomalous time series relative to other time series in some given collection by computing a vector of features for every time series. The feature list is extensive and includes the mean, variance, spectral entropy, lag correlation, strength of seasonality and trend, etc. Robust STL decomposition is employed to obtain some of these features. There is presently no option in the library to consider nonseasonal time series. Therefore, at present, this method is nonapplicable to nonseasonal time series. Principle component analysis is then performed to obtain the first two principal components. A two dimensional density based outlier detection algorithm is then used to determine the top k many outliers. Anomalous determines anomalous time series, whereas we are looking for anomalies within time series data. However, Anomalous can be adapted by dividing the entire time series into subseries. An index of the first time step can be returned in an anomalous subseries.

Multistep Prediction LSTMs can be trained to predict a window of time steps in the future. A multistep prediction LSTM has been developed to adapt to concept drifts after an initial period of training. After this initial period of training, this LSTM is trained in batches to determine anomaly scores. If the anomaly score is consistently large, this alerts the LSTM to adapt to the new normal. In addition to needing training time (and also having enough data for training), an anomaly score can be obtained after training another batch of data. Thus, if the batch size is three, an anomaly score can be obtained after every three time steps.

Hierarchical Temporal Memory Networks (HTMs) are memory-based systems that rely on storing a large set of patterns and sequences. HTMs are heavily influenced by the properties of the neocortex, the part of the brain involved with sensory perception. They are similar to neural networks but store data in a more restrictive fashion; memory is time-based and has a hierarchical structure. Input data is semantically encoded into a sparse distributed representation (SDR) that is very noise resistant. Like our brains, only a small number of neurons are active at a time (sparse), and many different neurons need to be activated at the same time to represent something (distributed). Similar inputs will have similar SDRs.

Spatial pooling is then done on the SDR to create sparse output vectors of a specified size and fixed sparsity. Spatial pooling helps retain context of the input data. If blindfolded and handed an apple, it would be difficult to determine the object. It is necessary to move fingers over the apple to feel its texture to determine the object. This contextual information is only possible with time. Spatial pooling retains context using an algorithm called temporal memory. The connections between active columns in the spatially pooled output array and active cells in the encoded sequence are strengthened whereas for inactive cells, they are weakened. HTM essentially learns which patterns tend to follow other patterns. Thus, HTMs are well suited for prediction and anomaly detection and especially in an online setting. By modeling the prediction error as a rolling normal distribution, anomaly likelihoods may be calculated for every time step.

An implementation of Numenta's HTM is available on Nupic which is well-suited for anomaly detection and prediction of streaming data sources. Another option is use HTM Studio, which is available for MAC OS/X and Windows. Predictions are presently not available for export. HTM Studio aims to be user-friendly, setting parameters automatically. At the present time, at least 400 time steps must be present in the dataset or HTM Studio will error out.

Netflix SURUS We considered Robust Principal Component Analysis (RPCA) is possible using Netflix SURUS. RPCA finds low rank representations of data using Singular Value Decomposition (SVD). More specifically, RPCA creates a matrix where every row is a seasonal interval of the time series. After standardizing the data, RPCA represents this matrix as the sum of a low rank matrix, sparse matrix, and an error matrix. An anomaly would have a large orthogonal distance from this lower dimensional PC space. By repeatedly calculating the SVD and thresholding the singular values and errors every iteration, RPCA can identify outliers. Netflix publicly released SURUS in 2015 (Netflix 2015) which uses RPCA (Candes et al. 2011) to detect anomalies.

The user inputs a frequency parameter (the seasonal interval that determines every row of the matrix in RPCA), and the length of the time series must be a multiple of this parameter or SURUS will error out. However, this begs the question of what to do if the time series displays seasonality but does not have the requisite number of time steps. For example, exchange-2 cpm results has 24-hour seasonality but 1,624 time steps which is not divisible by 24. If there is no seasonality, this parameter may be set to 1. One might consider truncating or padding the time series to avoid this error. However, padding could affect the representation of the seasonal matrix as a sum of a low rank matrix, sparse matrix, and error matrix. For these reasons, we recommend truncation (or a sliding window) may be used instead of padding.

The developers of SURUS recommend using the default parameters for two kinds of thresholds: the L.penalty (thresholding for the low rank approximation of the time series) and the s.penalty (thresholding for separating noise and sparse outliers). From experimentation of these parameters, the default s.penalty may be too low, creating a large number of false positives. (frequently over 50% of the dataset).

A method of decomposition, in which a time series is decomposed into four interpretable, latent components: seasonality (s), level (t), spikes (d), and noise (e) was considered. These components are estimated using a convex optimization process:

$$\min_{s,t,d,e}(\|Fs\|_1 + w_1|\Delta|_1 + w_2|d|_1)$$

subject to $$y = s + t + d + e$$

and $$|e|_2 \leq \rho$$

where F is the N by N DFT matrix (N=length of the time series or a chosen window size), Δt is the first difference operator applied to t, and $w_1$, $w_2$, and ρ are user-chosen parameters. The authors specifically choose $w_1=7$, $w_2=1$, and ρ=0.05 N. We solved this optimization problem using CVXPY. Depending on the size of N, the method may be time consuming.

Frameworks Other anomaly detection "methods" were considered. For example, Yahoo's EGADS is a framework for anomaly detection. It includes 3 separate components: forecasting, detecting, and alerting. The user could choose ARIMA for the forecasting component, the prediction error for the detecting component, and k-sigma for the alerting component. Similarly, LinkedIn's Luminol is a Python library for analyzing time series that can detect anomalies using SAX, absolute thresholding, etc. Many of these components are already discussed such as ARIMA and STL. Other popular frameworks include: Etsy's Skyline Etsy (2015) Skyline. https://github.com/etsy/skyline, Mentat Innovation's datastream.io, eleme's banshee, Opprentice Liu D, Zhao Y, Xu H, Sun Y, Pei D, Luo J, Jing X, Feng M (2015) Opprentice: Towards practical and automatic anomaly detection through machine learning. In: Proceedings of the 2015 Internet Measurement Conference, ACM, pp 211-224, and Lytics (2015) Anomalyzer. https://github.com/lytics/anomalyzer.

In summary, the following list of anomaly detection method are provided in the example described herein:
1. Windowed Gaussian
2. SARIMAX
3. Facebook Prophet
4. STL Residual Thresholding
5. Twitter AnomalyDetection
6. HOT-SAX
7. Generalized Linear Models
8. Anomalous
9. Hierarchical Temporal Memory Networks We can create a categorization of the methods. For example, STL and Prophet can both be considered decomposition-based methods because STL decomposes the time series into seasonality, trend, and residual components whereas Prophet decomposes the time series into trend, seasonality, holiday, and error term components. Twitter AD also uses STL as a preprocessing step. HTMs are a special kind of neural network. For statistical methods, the windowed Gaussian uses a Q-function, and Twitter AD uses the extreme studentized deviate test. Anomalous uses various statistical tests to determine some of its features. The HTM, Facebook Prophet, Generalized Linear Models, and SARIMAX all involve some element of forecasting. The last category, windowed methods, includes methods that use a sliding window.

Decomposition Based Methods:
  Prophet
  STL
  Twitter AD
Neural Network Based Methods:
  HTM
Statistical Methods:
  Windowed Gaussian
  Twitter AD
  Anomalous
Forecasting Based Methods:
  SARIMAX
  Prophet
  HTM
  Generalized Linear Models
Feature-Based Methods:
  Anomalous
Windowed Methods:
  Windowed Gaussian
  STL
  HOT-SAX
  Anomalous For anomaly detection methods that perform some form of forecasting, we perform grid search on the parameters to minimize the forecasting error. This includes methods such as Facebook Prophet and Generalized Linear Models. However, some methods do not perform such forecasting like Twitter AnomalyDetection, HOT-SAX, and Anomalous. One might intuitively think to split the time series into a training and testing set and obtain parameters to minimize the number of erroneous detections and maximize the correct ones. However, as anomalies are (and should be) rare, it can be difficult to obtain a train and test set containing both anomalous and non-anomalous behavior. Looking back at Table 1, most datasets have very few anomalies (at most 1-3). Thus, we perform grid search on the forecast when possible instead of the actual detection. When a forecast is not available, our goal is to choose models and parameters as intelligently as possible based on discovered time series characteristics. Once anomaly scores are obtained, we then determine the best threshold to actually increase precision and recall of detections.

For the windowed Gaussian, a sliding window with varying window sizes and step sizes directly on the time series values is used. Grid search was performed on the parameters to minimize the mean squared differences between the time series values and the mean of the window.

For SARIMAX parameters, R's auto.arima on the probationary period is used. auto.arima determines the best set of parameters according to a given information criterion (Akaike Information Criterion ('AIC')) and the stepwise algorithm, which is less likely to overfit compared to traditional grid search. A cumulative/rolling estimate of the prediction error (Gaussian) distribution is maintained and the Q-function to obtain an anomaly score between 0 and 1 is used. As for exogenous variables, seasonal regressors are selected based on the sampling frequency of each time series:

| Sampling Frequency | Indicator Features |
| --- | --- |
| Sub-daily | hour-of-day, day-of-week |
| Daily | day-of-month |
| Monthly | month-of-year |

For Facebook Prophet, we fill in the appropriate period parameter (s) as seasonality is a time series characteristic determined beforehand using ACF plots. We use "linear" for the growth parameter as setting it to "logistic" requires knowing a maximum and minimum value the data will reach such as a max population size in an area. For the datasets we consider, a hard maximum is typically unknown. For the remaining parameters (changepoint and seasonality prior scales), we use grid search to minimize the mean squared error between the forecast and the actual time series values.

For STL, we fill in the appropriate period parameter (n.p.) as seasonality is a time series characteristic determined beforehand. The remaining parameters such as the number of outer and inner loops, the window width (swindow), the degree of the locally-fitted polynomial in seasonal extraction (sdegree), the span (in lags) of the loess window for trend extraction (twindow), and the degree of locally-fitted polynomial in trend extraction (tdegree) are determined by grid search on the probationary period, minimizing the sum of squares of the residuals.

For Twitter AnomalyDetection, the direction of anomalies is set to 'both', the confidence level $\alpha=0.001$, and the upper bound percentage on the number of anomalies is set to 0.2% of the time series to emulate the Numenta anomaly benchmark (Numenta 2018b) in a streaming setting, it is impossible to know the number of anomalies beforehand. The anomaly score is the label (0 or 1).

For HOT-SAX, we use the same parameters as in Senin, P. ymbolic aggregate approximation, hot-sax, and sax-vsm implementation in python, https://github.com/seninp/saxpy (Senin P 2017) setting the alphabet size to 3, the piecewise aggregate approximation size to 3, and the z threshold for 0.01. The window size is set to 50, and the number of discords is set to 0.2% # of time steps to mimic Numenta's assumptions.

Our Generalized Linear Model (GLiM) GLiM has two parameters that are tuned based on the probationary period: the exponential forgetting factor, $\lambda$, and the step size parameter, $\eta$. Additionally, the algorithm is modified to learn a Poisson output distribution for count-valued datasets. Seasonal regressors are selected based on the sampling frequency of each time series like with the exogeneous variables of SARIMAX. All models include an intercept term.

For Anomalous, the number of anomalies k was set to be 0.2% # of time steps to emulate (Numenta 2018b) as in a streaming setting, it is impossible to know the number of anomalies beforehand. The anomaly score is the label (0 or 1). The time series is divided into multiple time series, each of length 100 with the exception of international-airline-passengers which uses 25.

HTM parameters are determined automatically for HTM Studio. We do not allow for time step aggregation. As 400 time steps are needed for HTM Studio, international-airlines-passengers could not be run through HTM Studio.

Table 2 displays all parameters used for every method. For parameters such as the seasonality period parameter which we determine from using an ACF plot, we place these under the "Learned" column. If we used grid search to choose a parameter, it will be under the "Grid Search" column. Remaining parameters such as confidence levels or upper bounds on number of anomalies are in the "User-Chosen" column. Table 2 illustrates parameters used for every anomaly detection method. For SARIMAX, s is the seasonality, p is the number of autoregressive components, q is the number of moving average components, d is the order of differencing, and P, D, Q are seasonal versions of p, d, q. For Prophet, s is the periodicity. For STL, n.p. is the periodicity, outer is the number of outer loops, inner is the number of inner loops, swindow is the window width, sdegree is the degree of the locally-fitted polynomial in seasonal extraction, twindow is the span (in lags) of the loess window for trend extraction, and tdegree is the degree of locally-fitted polynomial in trend extraction. For Twitter, upper is the maximum number of anomalies that the extreme studentized deviate test will detect as a percentage of the data, and a is the level of statistical significance with which to accept or reject anomalies. For the generalized linear model, the exponential forgetting factor is $\lambda$ and the step size parameter is $\eta$. For Anomalous, ts len is the length of each time series that the entire time series is divided into, and upper is the maximum number of anomalies that will be detected. Note that with HTM, we use HTM Studio where users have little choice with parameters because it is automatically determined.

TABLE 2

| Anomaly Detection Method | Learned | Grid Search | User Chosen |
|---|---|---|---|
| Windowed Gaussian | | window size, step size | |
| SARIMAX | s | p, d, q, P, D, Q | |
| Prophet | s, growth | seasonality mode, all prior scales | |
| STL | n.p. | outer, inner, swindow, sdegree, twindow, tdegree | |
| Twitter | | | Direction of anomalies, upper, $\alpha$ |
| HOT-SAX | | | # of discords, window size, alphabet and PAA size |
| Gernalized Linear Model | family | $\eta, \lambda$ | |
| Anomalous | | | ts len, upper |
| HTM | | | no aggregation |

Described below is an example with two different anomaly detection evaluation methods: window-based F-scores and Numenta Anomaly Benchmark (NAB) scoring according to principles described herein.

Anomaly Scores: Every anomaly detection method considered returns an anomaly score between 0 and 1 or is adjusted to return such a score (via a Q-function). For the latter methods, a sliding window computes the probabilities from a Gaussian distribution with a mean and standard deviation determined from this window. In this example, various window sizes were experimented with. For the windowed Gaussian, the anomaly score is based on the Q-function applied to the time series values themselves and is the tail probability of the Gaussian distribution. For SARIMAX, GLiM, and Prophet, the prediction error is fed to the Q-function. For STL, the residuals are used. For Twitter, Anomalous, and HOT-SAX, which return a 1 (if a point is an anomaly) or 0 (if not), this output is the anomaly score. For HOT-SAX, we use the first point of the discord.

A threshold is set on this score to determine what is an anomaly. The determination of this threshold is discussed further below.

To evaluate and compare the anomaly detection methods, we use the metrics of precision and recall to compute the F-score (harmonic mean of the precision and recall, 2×((precision×recall)/(precision+recall))). Accuracy, alone, is not the best measure due to class imbalance (very few anomalies typically exist). We consider precision and recall on anomaly windows as points are too fine a granularity. An anomaly window is defined over a continuous range of points and its length can be user-specified. For the purposes of this example, we use the anomaly window size:

$$\frac{.1 * \text{length(time series)}}{\text{number of true anomalies}}$$

Note that the probationary period (the first 15%) of the time series is not removed before determining the window length. Also, we acknowledge that the number of ground truth anomalies is not known beforehand in an online setting, implying that the window size will most likely be an application specific user choice. Numenta uses 2 for the denominator.

One might consider rewarding an anomaly detection method that detects outliers earlier rather than latter in a window. In addition, some users may want to emphasize true positives, false positives, and false negatives differently. This gives rise to an application profile, $\{A_{FN}, A_{TP}, A_{FP}\}$, which are weights for false negatives, true positives, and false positives, respectively. The authors in Numenta 2018b create a methodology to determine NAB anomaly scores based on these application profiles. For every ground truth anomaly, an anomaly window is created with the ground truth anomaly at the center of the window. The length of the window can either be user-chosen or set described above with respect to window-based F— scores.

For every predicted anomaly, y, its score, $\sigma(y)$, is determined by its position, pos(y), relative to a window, w, that y is in or a window preceding y if y is not in any window. More specifically, $\sigma(y)$ is:

$$(A_{TP} - A_{FP})\left(\frac{1}{1+e^{5pso(y)}}\right) - 1$$

if y is in an anomaly window. If y is not in any window but there is a preceding anomaly window w, use the same equation as above, but determine the position of y using w. If there is no preceding window, $\sigma(y)$ is $A_{FP}$.

The score of an anomaly detection method given a single time series is $$A_{FN}f_{ts} + \sum_{y \in Y_{ts}} \sigma(y)$$

where $f_{ts}$ represents the number of ground truth anomaly windows that were not detected (no predicted anomalies exist in the ground truth anomaly window), and $Y_{ts}$ is the set of detected anomalies.

The score is then normalized by considering the score of a perfect detector (outputs all true positives and no false positives) and a null detector (outputs no anomaly detections). The normalized score can be negative when the false positive rate is high. A normalized score can also be larger than 100 if anomalies are detected very early in the window.

If multiple predictions exist in a window, the earliest detection is kept, and the rest are ignored. In some cases, multiple ground truth anomalies should not exist in a single window by virtue of the detailed anomaly tagging instructions given in (Numenta 2017) and (Lavin and Ahmad 2015b).

NAB anomaly scores are not perfect. NAB scores rewards early detection via the sigmoid function, but it may be difficult to take into account early or late detection in the context of methods that already use windowing.

To choose the anomaly score threshold, we use the same methodology as in (Numenta 2018b). However, instead of choosing the threshold (in steps of 0.0001) based on what returns the best NAB score, we choose the threshold based on what returns the minimum number of window mistakes across all datasets comprising a corpus (where every behavior type has its own respective corpus.) Methods like Twitter AD have an anomaly score threshold that can appear very small (0.0001), but recall that Twitter AD returns a label of 0 or 1, and this label is the anomaly score. Thus, having an anomaly score threshold of 0.0001 is really no different from having a threshold of 1 in the case of Twitter AD. This applies to any method where the label is the anomaly score. In determining the threshold, we chose to give a weight of 1 to false negatives ($w_{FN}=1$) and vary the weight of false positives ($w_{FP} \in \{0.1, 0.2, \ldots 1\}$) because of our concerns with alarm fatigue. We report on the best F-score out of the $w_{FP}$ tested. Plots of anomaly detections for all datasets for every $w_{FP}$ are included in https://github.com/cynthiaw2004/adclasses. The threshold remains relatively stable under various weighting schemes.

NAB Anomaly Score Thresholding: We use the code provided in Numenta and the standard profile for NAB scoring, meaning that false positives and false negatives are given equal weights. The anomaly score threshold is determined by what returns the best NAB score on the corpus. Instead of trying every possible threshold, a local hill-climbing algorithm may be used.

Figure 7:
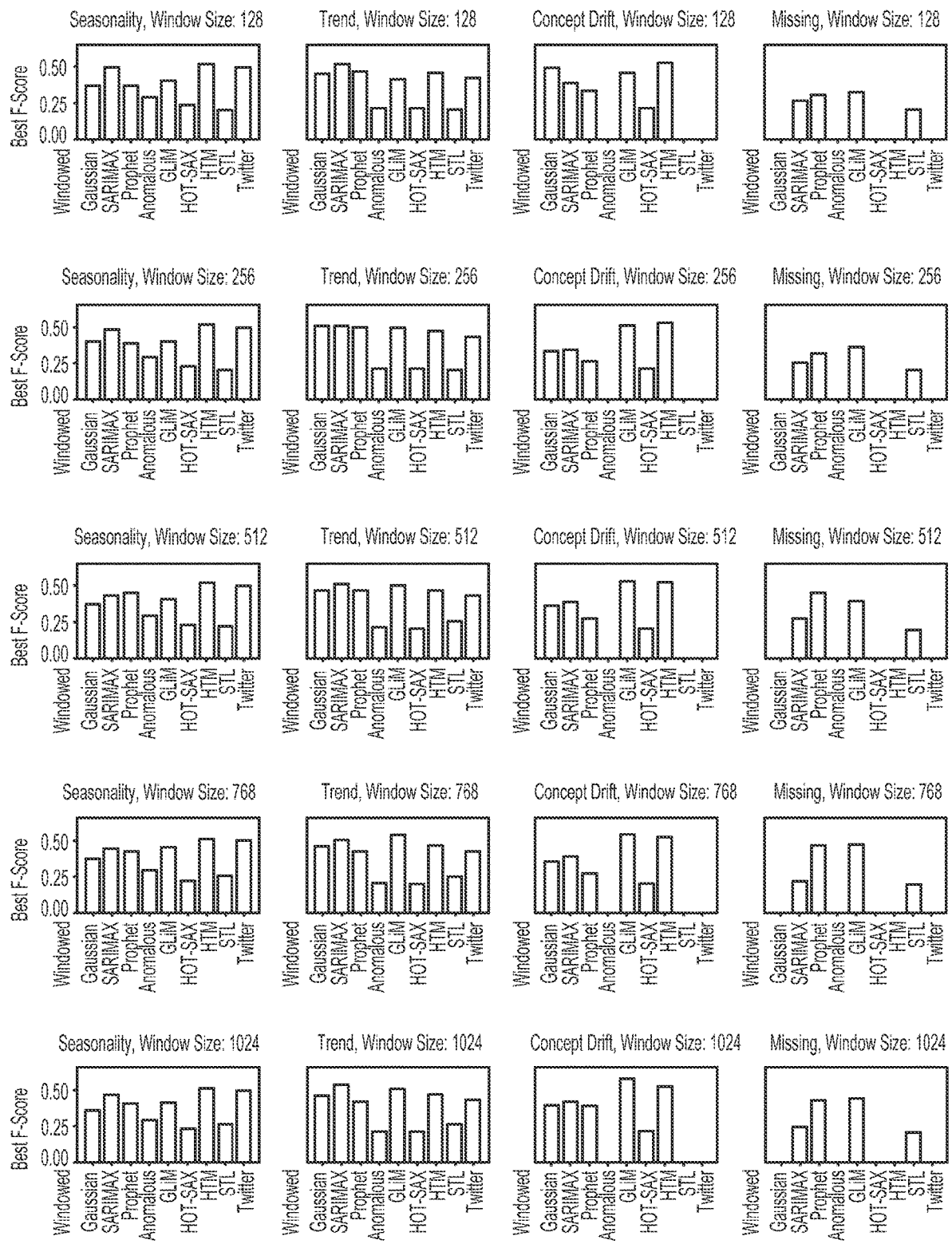
FIGS. 7 and 8 show the F-scores and NAB scores for the nine anomaly detection methods discussed on various time series characteristics and window sizes.
Figure 8:
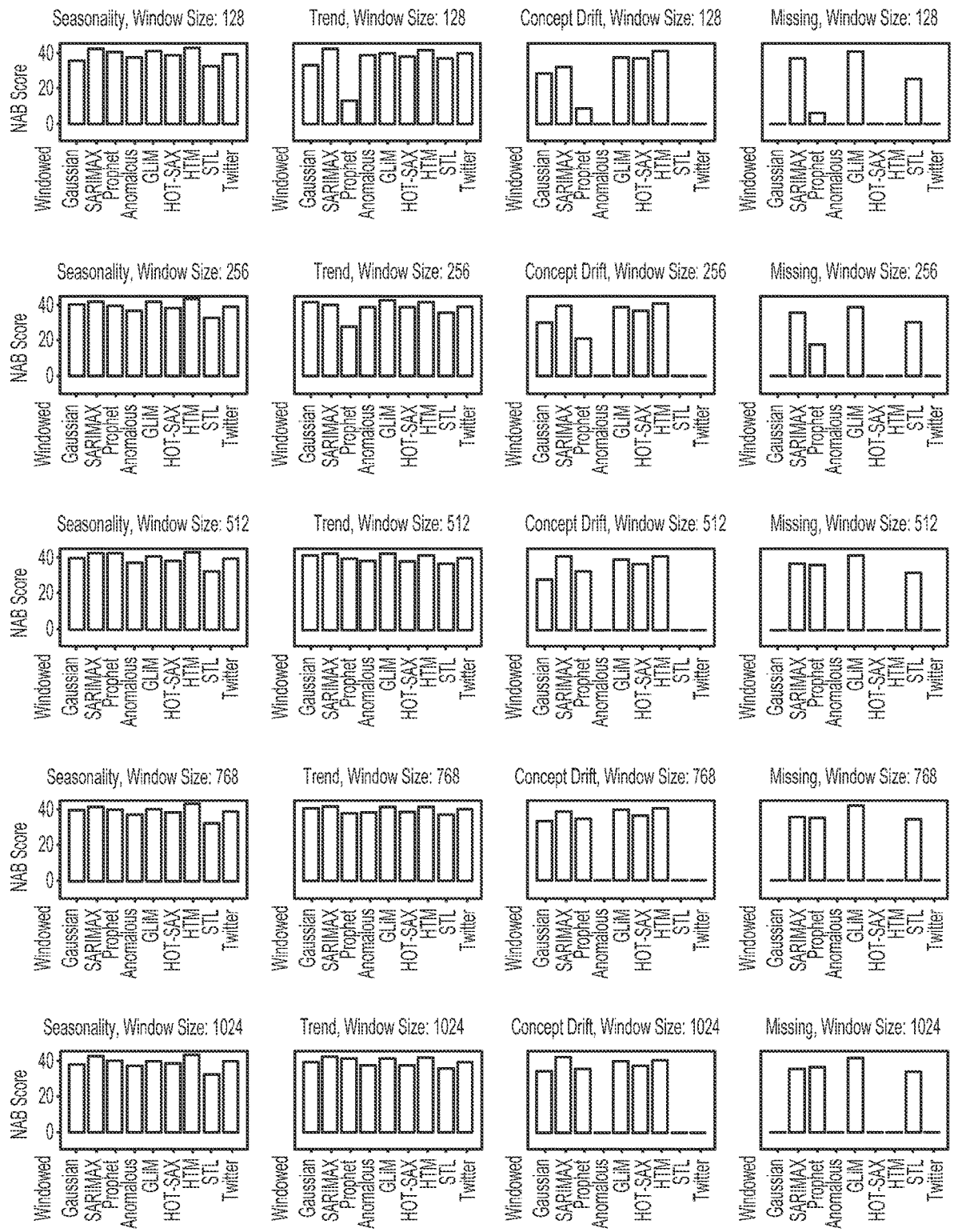

FIGS. 7 and 8 show the F-scores and NAB scores for the nine anomaly detection methods discussed on various time series characteristics and window sizes. FIGS. 9, 10, 11, 12, 13, 14, 15, and 16 explicitly show the values used in the bar charts with the best result in bold. The window size is used in the creation of the anomaly scores; recall that a sliding window computes the probabilities from a Gaussian distribution with a mean and standard deviation determined from this window. For example, for SARIMAX, the prediction error is used for this sliding window. With the exception of international-airline-passengers, which uses a window size of 100, the window sizes experimented with are 128, 256, 512, 768, and 1024.

FIG. 9 is a table showing seasonality corpus F-scores for the nine different anomaly detection methods (columns) for various window sizes (rows). FIG. 10 is a table showing seasonality corpus NAB scores for the nine different anomaly detection methods (columns) for various window sizes (rows). FIG. 11 is a table showing trend corpus F-scores for the nine different anomaly detection methods (columns) for various window sizes (rows). FIG. 12 is a table showing trend corpus NA scores for the nine different anomaly detection methods (columns) for various window sizes (rows). FIG. 13 is a table of concept drift corpus F-scores for the nine different anomaly detection methods (columns) for various window sizes (rows). FIG. 14 is a table showing concept drift NAB scores for the nine different anomaly detection methods (columns) for various window sizes (rows). FIG. 15 is a table showing missing corpus F-scores for the nine different anomaly detection methods (columns) for various window sizes (rows). FIG. 16 is a table of missing corpus NAB scores for the nine different anomaly detection methods (columns) for various window sizes (rows).

Note that the window size only affects certain anomaly detection methods. Twitter, Anomalous, and HOT-SAX return a label which already is the anomaly score. No sliding window is necessary. That the sliding window refers to the window used to create an anomaly score given the output of an anomaly detection method and not any sliding window used in the anomaly detection method itself (as a sliding window is used in HOT-SAX).

For HTM, a normalized anomaly score between 0 and 1 is returned so no sliding window is necessary there either.

Thus, Twitter, HOT-SAX, Anomalous, and HTM will have the same results regardless of window size.

In some instances, no F-score or NAB score appears (e.g. STL, Anomalous, and Twitter are missing for concept drift). This is because STL, Anomalous, and Twitter are only applicable to seasonal datasets. None of the datasets in the concept drift corpus display evidence of seasonality. There are also many "missing" scores for the missing time steps corpus but this is because only several anomaly detection methods (Prophet, STL, GLiM, SARIMAX) can innately handle missing time steps. All other methods require some form of interpolation which we perform with other corpi if necessary.

Figure 6:
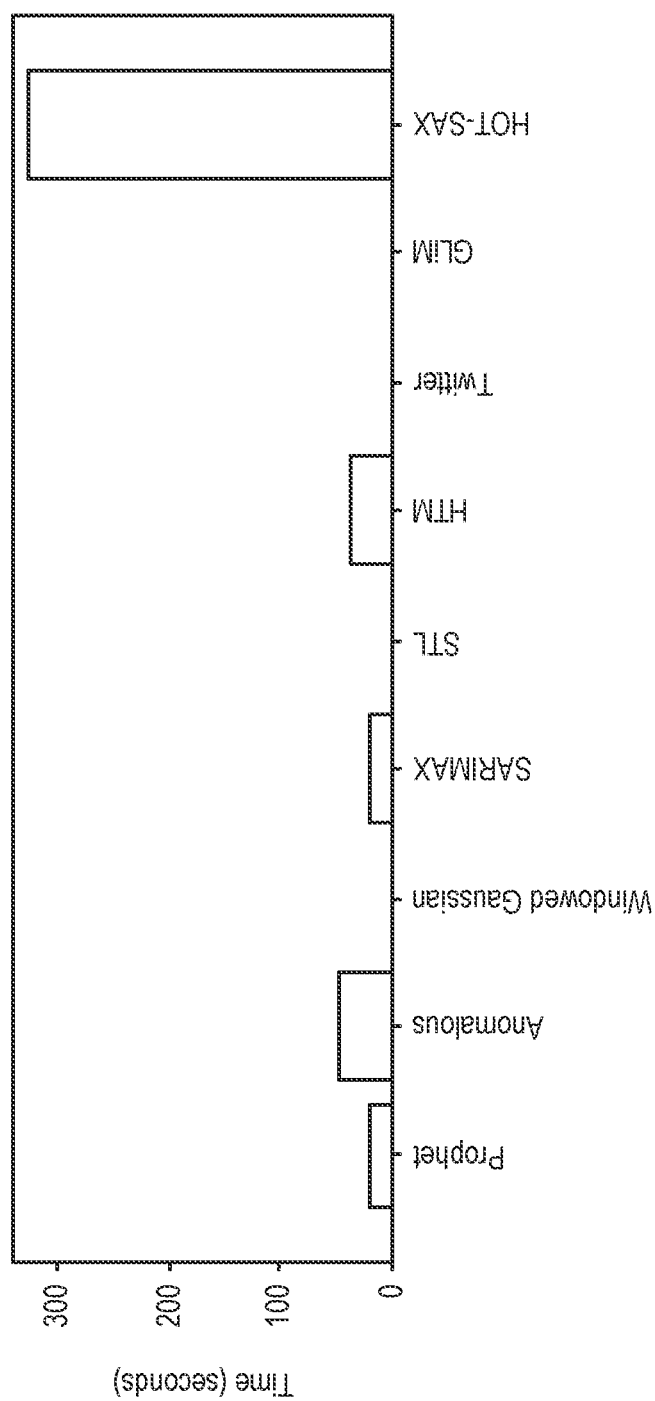
FIG. 6 displays the average amount of time required to generate anomaly scores for each of the anomaly detection methods considered over all datasets.

FIG. 6 displays the average amount of time required to generate anomaly scores for each of the anomaly detection methods considered over all datasets. This is for both training and inference. In describing the complexity of the algorithms evaluated, the following variables are considered:

N Length of time series
D Size of state and/or external regressors
K Maximum number of anomalies
W Window size In the worst case, HOT-SAX examines all pairs of subsequences, and so the algorithm has running time $O(N^2)$. Finding multiple discords involves repeated calls to the main algorithm which leads to the factor K. We set K based on the length of the time series so this hides a cubic dependence on the time series length. However, the empirically observed scaling of the inner loop was close to linear which implies that the SAX-based heuristic works well for our datasets.

Although the window size was tuned in NAB to return the "best NAB score", the window size they use (6400) is considerably larger than the number of time steps in most of their datasets.

Anomalous computes a fixed set of features from each time series, which, in our application, corresponds to a window of W time steps. Several of the features are based on the spectrum or autocorrelation; thus, the factor $O(W \log W)$. After computing the features, the method applies PCA and constructs the α-hull from the largest two components which can be done in $O(N \log N)$ time.

| Prophet | $O(N \times W)$ |
|---|---|
| STL Residual Threshold | $O(N \times W)$ |
| Twitter AD | $O(N^2 \times K)$ |
| Anomalous | $O(N \log N) + O(W \log W)$ |
| HOT-SAX | $O(N^2 \times K)$ | for this, assuming O(N) for finding the median and median absolute deviation. The complexities of the methods that consume the entire time series at once are summarized below:

We also evaluated four online algorithms where the criteria for being online are (1) the entire time series does not need to be retained and (2) future values do not influence past predictions.

| Windowed Gaussian | $O(N \times W)$ |
|---|---|
| SARIMAX | $O(N \times D^2) + O(N \times W)$ |
| Recursive GLiM | $O(N \times D^2)$ |

The state in a SARIMAX model must be sufficiently big enough to store up to the largest seasonal lag. This makes the quadratic term a significant constraint; hence, it is recommended to instead use indicators or Fourier bases to account for very long term seasonal variation.

How does window size affect scoring? Note that when we refer to window size, we refer to the window size used in the creation of anomaly scores. This window slides across certain values (e.g. prediction errors, unnormalized anomaly scores, or the time series values themselves) and computes probabilities from a Gaussian distribution with the mean and standard deviation determined from this window. This window size does not refer to the window used in calculating window-based F-scores.

It is difficult to establish patterns such as "anomaly detection method x improves in performance when the window size increases" as we have only looked at 5 window sizes. However, what we can observe is that window size affects the NAB and windowed F-scores for Prophet more than any other method.

Figure 17A:
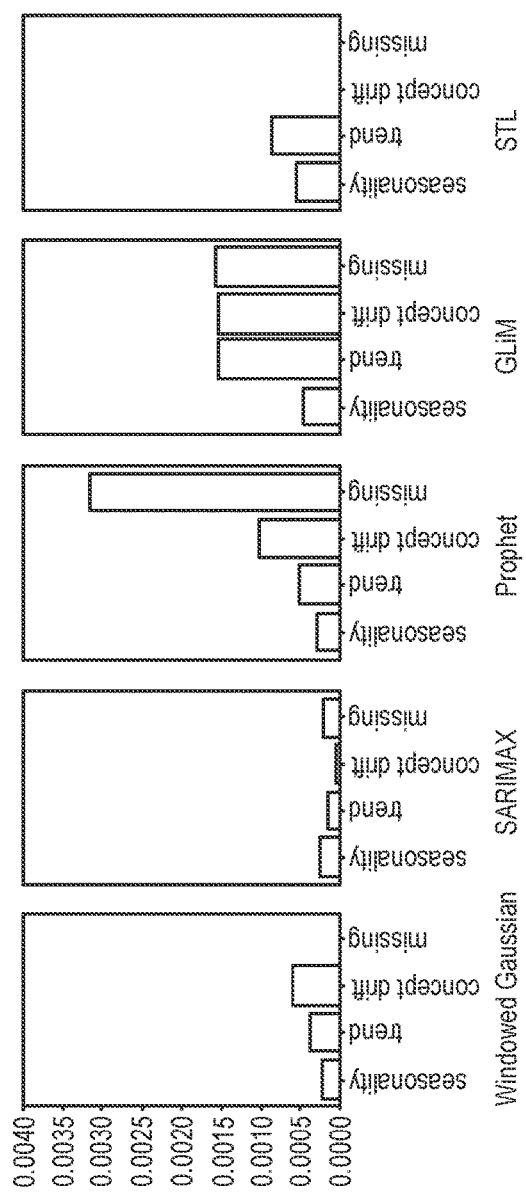
FIG. 17A illustrates a variance of F-score score differences based on window size for various anomaly detection methods and time series characteristics.
Figure 17B:
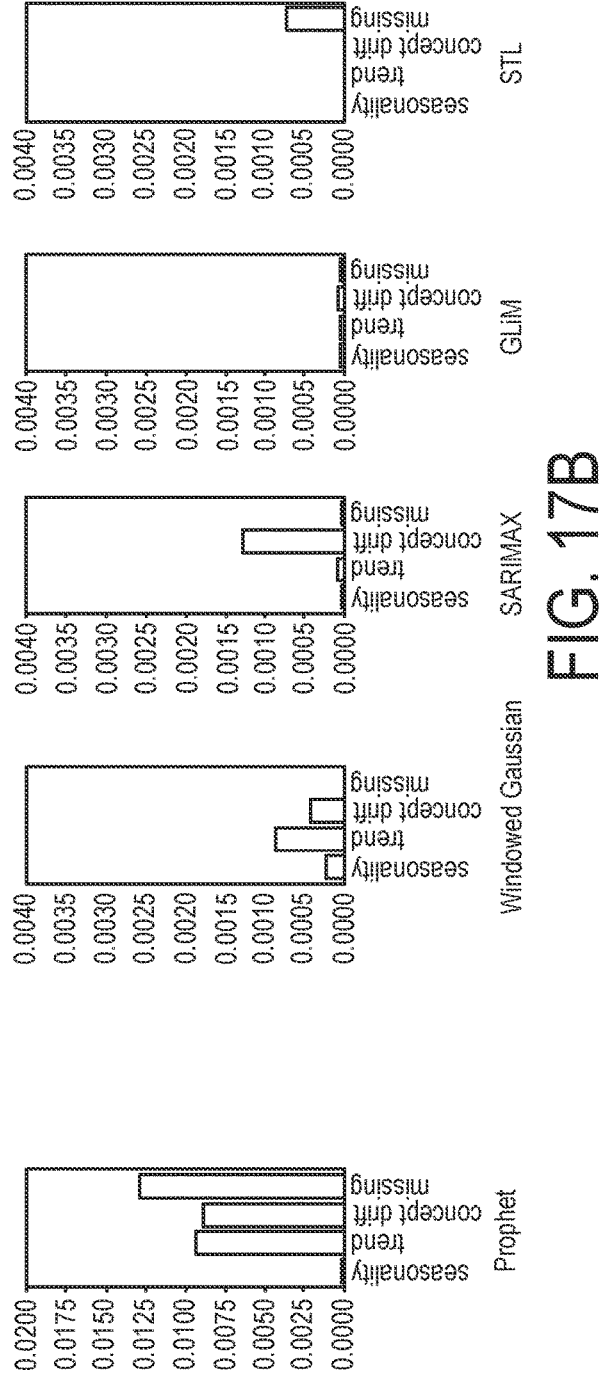
FIG. 17B illustrates a variance of NAB score differences based on window size for various anomaly detection methods and time series characteristics.

Given an anomaly detection method and time series characteristic, we should obtain 5 F-scores (one for each window size: 128, 256, 512, 768, and 1024). We consider every 2-combination of these 5 F-scores and obtain the absolute difference of every combination. We then plot the variance of these differences in FIG. 17A. We repeat this process with NAB scores (divided by 100 to be on a comparable scale to F-scores which lie between 0 and 1) in FIG. 17B.

Note that we do not consider Anomalous, Twitter, HOT-SAX, and HTM in this figure because the window size does not affect the performance of these 4 methods; no sliding window is used at all as these methods already return a normalized anomaly score between 0 and 1 and do not need to be manipulated in some way to produce one. Thus, as window size does not change the performance, their variance differences will obviously be 0.

For F-scores, the y-axis spans from 0 to 0.004 for all plots from left to right. For the NAB scores, however, the first plot (for Prophet) ranges from 0 to 0.02, while the remaining 4 have the same y-axis as the F-score plots (0 to 0.004).

For Facebook Prophet, both NAB and windowed F-scores have a jump in variance. The big jump in NAB score variance in this method is expected given that Prophet jumps from a NAB score of 5.63 at window size 128 to a NAB score of 36.11 at window size 1024 for the missing time steps corpus. The number of false positives steadily decreases as the window size increases for Prophet on missing time steps. We see similar behaviors with windowed F-scores. When the window size chosen is too small, Prophet (which works on the forecasting errors) will have considerably more false positives (see FIG. 18A) as compared to Prophet on a larger window size (see FIG. 18B). It is worth mentioning that previous literature state that a direct comparison to NAB may be difficult due to several irregularities (such as determining anomaly window sizes a priori and non-normalized scoring due to no lower bound).

There is a granularity difference between the methods. Threshold determination for the F-score proceeds in steps of 0.0001 from 0 to 1 whereas for NAB scores, threshold granularity will go down to 0.00001 in step size for the local hill-climbing algorithm (although being "stuck" in a local optima is a possibility).

NAB scores reward early detection of anomalies. For NAB scoring, a window is created for every ground truth anomaly, with the anomaly right in the center of the window. Given a predicted anomaly, a position function determines the position of the prediction relative to the ground truth anomaly in its window. If the prediction is within the window but before the actual anomaly, the reward is even greater than having the prediction on the exact same time step as the actual anomaly. Only the first detection point in the window may matter such that all others are ignored. If using point-based precision and recall, a detection slightly earlier than the ground truth anomaly would be punished. We use window-based precision and recall, but windows are not created around ground truth anomalies; these windows are the same size as designated in Numenta, but the entire time series is divided into windows. Thus, there is the possibility that a predicted anomaly may be rewarded under NAB as it is positioned in the same window as a ground truth anomaly but is earlier (left side of the window) but be punished under the window-based F-score system as the predicted anomaly may be in an entirely different window from the ground truth anomaly.

Take, for example, FIGS. 19A and 19B where we plot the true outliers vs. the predicted outliers under the F-score scheme and NAB for a dataset (ec2_cpu_utilization_ac20cd) in the concept drift corpus under a window size of 768. A point of possible interest is why SARIMAX seems to perform quite well on concept drift under NAB but is mediocre under the windowed F-score. FIGS. 19A and 19B help us understand why.

The true outliers are denoted in x's, and predicted outliers are represented as circles. FIG. 19A shows F-score predicted outliers, and FIG. 19B displays NAB score predicted outliers. Under our F-score scheme, four anomalies are detected. For NAB, there is considerably more. Note, however, for NAB, that several occur right before the true anomaly occurs at time step 3580. These detections that occur right before are actually within the window around the ground truth anomaly (recall that NAB uses a window size of (0.1*length (time series))/number of true anomalies. Thus, the first of these early detections right before time step 3580 actually increases the NAB score (subsequent detections in the same window are ignored). For the F-score, it was determined that any threshold below 1 (under a 0.0001 granularity) would produce more weighted mistakes than no predictions whatsoever. Also note that this is weighted mistakes across the entire concept drift corpus, and not just ec2_cpu_utilization_ac20cd. Determining a threshold that is best for an individual dataset runs into the risk of overfitting.

In sum, our F-score scheme tends to be more restrictive with its detections than NAB, reducing false alarms, but it also does not reward early detections like NAB does. What evaluation metric to use is entirely based on the needs of the user's application. Additional strengths and weaknesses on the NAB scoring method are discussed in Tatbul N, Lee T J, Zdonik S, Alam M, Gottschlich J (2018) Precision and recall for time series. In: Advances in Neural Information Processing Systems, pp 1922-1932 (Tatbul 2018), Lavin A, Ahmad S (2015a) Evaluating real-time anomaly detection algorithms—the numenta anomaly benchmark. In: Machine Learning and Applications (ICMLA), 2015 IEEE 14th International Conference on, IEEE, pp 38-44 (Lavin and Ahmad 2015a) and Singh N, Olinsky C (2017) Demystifying numenta anomaly benchmark. In: Neural Networks (IJCNN), 2017 International Joint Conference on, IEEE, pp 1570-1577 (Singh and Olinsky 2017).

Which anomaly detection method should I use when? Now, we determine, based on examples of FIGS. 7 and 8 which anomaly detection methods perform better than the others given an exemplary time series characteristic.

For seasonality, both the F-scores and NAB scores suggest HTM and SARIMAX. Windowed F-scores also favor Twitter whereas NAB scores favor Prophet. SARIMAX and Prophet have decomposition methods with components specifically built for seasonality which might explain their performance on this characteristic. SARIMAX's performance may be due to the fact that seasonal versions of the autoregressive component, moving average component, and difference are considered. As for HTMs, its performance on seasonality is logical given that the basic principle of HTMs is the memory of sequences. Everything that the neocortex does is based on memory and recall of sequences of patterns. Thus, if a time series exhibits lower values in the winter and higher values in the summer (e.g. number of bike rentals), the HTM will learn that there is a pattern of higher values in the summer followed by a pattern of lower values in the winter. Twitter performs STL on the entire dataset and applies the Extreme Studentized Deviate Test on the residuals. STL breaks the time series apart into a seasonality, trend, and residual component, so it is also a decomposition-based method. This might bring up the concern as to why the base method STL only achieves mediocre performance, but this is most likely because Twitter takes the entire time series and feeds it to STL with s.window='periodic' and robust=TRUE (there is no user control on this) whereas in our base STL method, we only use the probationary period to determine the parameters first. In addition, there are different thresholding metrics with Twitter using the ESD test and STL using the Q-function.

For trend, both the F-scores and NAB scores favor SARIMAX. Windowed F-scores also prefer Prophet whereas NAB scores prefer GLiMs. SARIMAX and Prophet both have decomposition methods with components specifically built for trend. The integrated portion of SARIMA allows for differencing between current and past values, giving this methodology the ability to support time series data with trend. GLiM makes use of an exponential forgetting factor which gives it the ability to forget the past and adapt to current data. For concept drift, both the F-scores and NAB scores suggest that the HTM would be a workable choice. The F-scores also favor the GLiM, and NAB favors SARIMAX for this characteristic. For GLiM, this is probably due to the exponential forgetting factor. SARIMAX's ability to handle concept drifts is surprising given that its parameters are only determined in the probationary period (whereas the concept drift typically occurs after the probationary period). There were many instances where the predicted anomalies were identical using the F-scores or NAB scores. However, the predictions tend to occur a little earlier than the ground truth anomalies which "inflates" the NAB scores. SARIMAX, understandably, does not perform as well under the F-score scheme.

Figure 20:
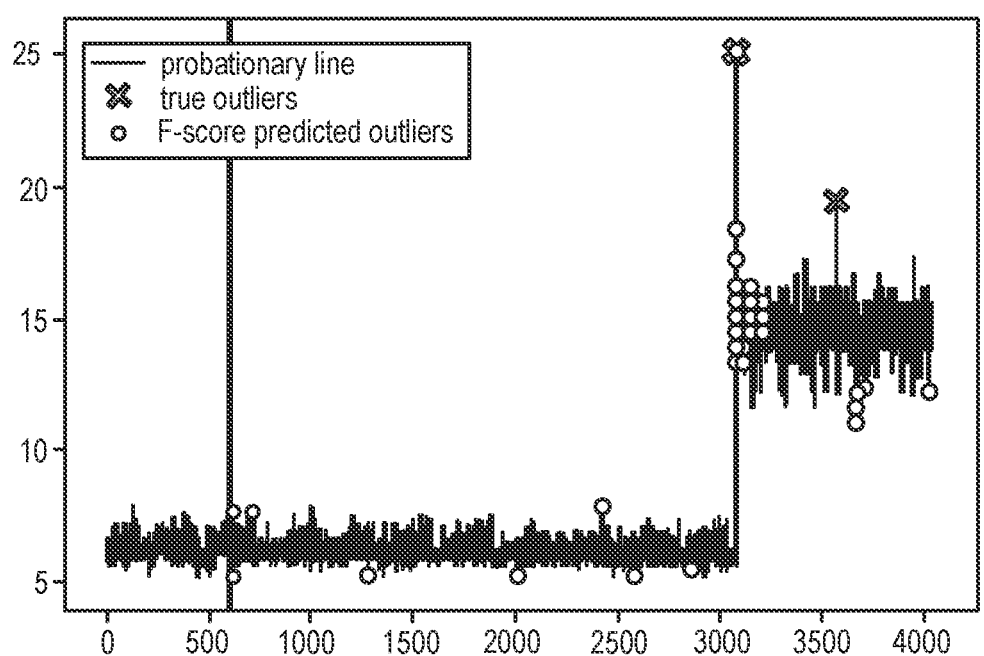
FIG. 20 illustrates predicted and true outliers for the rds_cpu_utilization_cc0c53 time series under Prophet using concept drift thresholds.

Facebook Prophet does not achieve the highest scores with concept drift which is surprising given that it is built to detect concept drift automatically, and we have optimized the changepoint prior scale using grid search, minimizing the MSE. We know that Prophet is greatly affected by window size (if it is too small, there are too many false positives), but if we look at larger window sizes such as 512, we can see that Prophet is sensitive to noise and struggles to adapt quickly after the occurrence of a concept drift, with many false positives occurring after the jump (see FIG. 20).

For missing time steps, both the NAB scores and windowed F-scores favor GLiMs. However, we caution against thinking that this means GLiMs are workable for time series with missing time steps; the missing time steps corpus contains many datasets with trend and concept drift which GLiMs perform well on due to the exponential forgetting factor.

Although the HTM appears to perform quite well on seasonality, trend, and concept drift (not always first place, but consistently highly ranked), FIG. 6 shows that it is not necessarily the fastest method, and depending on the needs of the user, another method may be preferable given the time step size. In addition, if the time series contains missing time steps, HTMs cannot handle them innately.

In this example, we have analyzed the performance of 9 anomaly detection methods (the windowed Gaussian, SARI-MAX, Facebook Prophet, Anomalous, Generalized Linear Models, STL residual thresholding, Twitter AD, HOT-SAX, and HTM) on several time series characteristics (seasonality, trend, concept drift, and missing time steps). We create corpora of behaviors with 10 datasets for every time series characteristic. By analyzing both the windowed F-score as well as the NAB scores, we determine which methods tend to perform better or worse on these characteristics (see Table 3).

We observe that:

Our F-score scheme is more restrictive with anomaly detections compared to NAB because it is more sensitive to false positives. Since NAB rewards early detection for anomalies, there is more wiggle room for false positives under NAB.

For seasonality, our F-score scheme and NAB scores favor SARIMAX and HTM. Windowed F-scores also favor Twitter whereas NAB scores favor Prophet. Decomposition-based methods with components specifically for seasonality aid in performance on this characteristic.

For trend, both our F-score scheme and NAB favor SARIMAX. Windowed F-scores also favor Prophet whereas NAB scores favor GLiMs. Decomposition-based methods with components specifically for trend aid in performance on this characteristic.

For concept drift, both our F-score scheme and NAB favor HTMs. Our F-score scheme also favors GLiMs whereas NAB favors SARIMAX.

For the missing time steps corpus, both windowed F-scores and NAB scores favor GLiMs.

Python's Pyramid cannot handle missing time steps in determining SARIMAX parameters, but R's auto.arima can.

Although STL can innately handle missing time steps, different implementations may or may not be able to. For example, R's stl cannot handle missing time steps but stlplus can.

Twitter AD TS only allows for 1 minute, 1 hour, and 1 day time step sizes and will automatically determine a seasonality parameter vs. AD VEC which does not have such time step size restrictions but the user must input the periodicity. Twitter AD, in general, requires the time series to have seasonality as its periodicity parameter must be larger than 1.

Table 3 illustrates results of the example anomaly detection analysis A check mark indicates the F-score scheme favors the method whereas an x indicates NAB favors the method. Note that if there is a N/A, it means that method is not applicable given that time series characteristic. Not shown: STL, Anomalous, and Twitter are unable to deal with non-seasonal datasets.

TABLE 3

| | Seasonality | Trend | Concept Drift | Missing Time Steps |
|---|---|---|---|---|
| Windowed Gaussian | | | | N/A |
| SARIMAX | ✓x | ✓x | x | |
| Prophet | x | ✓ | | N/A |
| Anomalous STL | | | | N/A |
| Twitter | ✓ | | | N/A |
| HOT-SAX | | | | N/A |
| GLiM | | x | ✓ | ✓x |
| HTM | ✓x | | ✓x | N/A |

According to principles described above, a time series dataset is tagged or annotated to denote various time series parameters/classification such as seasonality, trend, concept drift, missing time steps and the like and indicate anomalies. Tagging may be manual or automated. After tagging, the "tagged" dataset is analyzed using windowed F-scores and NAB (Numenta Anomaly Benchmark) scores. An exemplary comparison of evaluation methods using these two scoring methods are described herein. After the tagged dataset is analyzed using the windowed F-Scores and NAB scores, the resulting scores are used as a comparison benchmark for the particular tagged dataset to determine a best method to determine additional anomalies for a time series of the same type/classification as the tagged dataset.

Anomaly detection often must be done on real-world streaming applications. Thus, we included the time it took to train the methods (if training is necessary) as well as detection. Finally, in experimentally testing anomaly detection methods on a wide variety of datasets, we revealed areas where many of these methods are lacking but are not brought to light. For example, Twitter Anomaly Detection can only be used with seasonal datasets.

We follow the definition where a time series is defined as a sequence of pairs $T=[(p_1, t_1) \ldots (p_n, t_n)](t_1<t_2< \ldots <t_n)$ where each $p_i$ is a data point in a d-dimensional space and each $t_i$ represents the time stamp at which the corresponding $p_i$ occurs. Given the challenges present in anomaly detection, we aim to simplify the process in choosing the most promising anomaly detection methods for a given time series. In the foregoing we discuss several characteristics that a time series can possess; consider ways to automatically detect these characteristics; provide example datasets for said characteristics; and review a variety of anomaly detection methods.

According to principles described herein a method for automatically determining an anomaly detection method for use on a class of time series can include receiving at processor a plurality of datasets for each type of time series characteristic for a given time series, wherein each time series has been classified into one of a known class based on expected properties of the time series before receipt by the processor; filtering a set of possible detection methods based on the time series class; and evaluating the remaining detection methods on the given time series using the specific evaluation metric and selecting and returning a recommended anomaly detection method based on the specific evaluation metric.

According to principles described herein a method for automatically determining an anomaly detection method for use on a class of time series, can include receiving at processor a plurality of datasets for each type of time series characteristic for a given time series, wherein each dataset includes annotations indicating anomalies and each dataset has at least one time series characteristic; determining a type of anomaly in each dataset; applying a first anomaly detection method to the plurality of datasets and applying a second anomaly detection method to the plurality of datasets; evaluating results of the first anomaly detection method using one of an area under the curve analysis and an NAB score; evaluating results of the second anomaly detection method using one of an area under the curve analysis and an NAB score; and comparing results of the area under the curve analyses and the NAB scores for the first anomaly detection method and the second anomaly detection method, and selecting one of the first anomaly detection method and the second anomaly detection method for use with time series sharing characteristics with the given time series.

According to principles described herein a method of separating time series data into classes having similar attributes that includes receiving a sample time series of a given class, the sample time series having labels identifying anomalies in the time series; calculating a windowed F-score for each of a plurality of anomaly detection methods for the sample time series; and calculating a Numenta anomaly benchmark (NAB) score for each of the plurality of anomaly detection methods for the sample time series; and based on the windowed F-scores and the NAB scores, selecting one of the plurality of anomaly detections methods for application to any time series of the given class Any of the methods described herein can be embodied in one or more non-transitory computer readable media storing computer-executable instructions that, when executed by one or more processors, cause the one or more processors to perform any of the above described methods. Moreover, a system may comprise processors and more non-transitory computer readable media storing computer-executable instructions that, when executed by the one or more processors, cause the one or more processors to perform any of the above described methods.

Any of the above systems, methods or computer readable media, may further include that the known class includes at least one of seasonality, trend, concept drift and missing time steps.

Any of the above systems, methods or computer readable media, may further include that the evaluating the remaining detection methods is performed using at least one of a windowed F-score and a Numenta anomaly benchmark (NAB) score.

For any of the above systems, methods or computer readable media, each dataset may be labeled or pre-labeled/annotated to identify anomalies therein.

For any of the above systems, methods or computer readable media, each dataset may include a probationary period of unlabeled data.

For any of the above systems, methods or computer readable media, the plurality of datasets may include pre-annotated datasets across a variety of domains and scripts For any of the above systems, methods or computer readable media, the type of anomaly may be one of a collective type, point type and a contextual type anomaly.

For any of the above systems, methods or computer readable media, the first anomaly detection method and the second anomaly detection method may be one of windowed Gaussian, SARIMAX, Facebook Prophet, STL Residual Thresholding, Twitter AnomalyDetection, HOT-SAX, Generalized Linear Models, Anomalous and Hierarchical Temporal Memory Networks.

For any of the above systems, methods or computer readable media, each time series may be classified into one of a known class based on expected properties of the time series before receipt by the processor Table 4 provides a list of acronyms and their definitions as used herein.

TABLE 4

Table of acronyms and their definitions.

| Acronym | Definition |
|---|---|
| ACF | AutoCorrelation Function |
| AD TS | Anomaly Detection Time Series (Twitter) |
| AD VEC | Anomaly Detection Vector (Twitter) |
| AIC | Akaike Information Criterion |
| CPC | Cost Per Clicks |
| CPM | Cost Per thousand iMpression |
| ELBO | Evidence Lower Bound |
| ESD | Evidence Studentized Deviate (test) |
| GLiM | Generalized Linear Model |
| GRU | Gated Recurrent Unit |
| HTM | Hierarchical Temporal Memory (network) |
| IVA | Intelligent Virtual Assistant |
| KPI | Key Performance Indicator |
| LMS | Least Mean Square |
| LSTM | Long Short-Term Memory |
| MAD | Median Absolute Deviation |
| MAP | Maximum A Posteriori |
| MCMC | Markov Chain Monte Carlo |
| NAB | Numenta Anomaly Benchmark (score) |
| PAA | Piecewise Aggregate Approximation |
| RLS | Recursive Least Squares |
| RPCA | Robust Principal Component Analysis |
| SARIMAX | Seasonal AutoRegressive Integrated Moving Average with eXogeneous variables |
| SAX | Symbolic Aggregate approXimation |
| SDR | Sparse Distributed Representation |
| SGVB | Stochastic Gradient Variational Bayes |
| STL | Seasonal decomposition of Time series by Loess |
| VAE | Variational Auto Encoder |

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Throughout this application, various publications may have been referenced. The disclosures of these publications in their entireties are hereby incorporated by reference into this application in order to more fully describe the state of the art to which this invention pertains.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A method, for automatically determining an anomaly detection method for use on a class of time series, comprising:
receiving, by a processor, a plurality of datasets for a given time series, wherein each of the plurality of datasets is associated with a different one of a plurality of predefined time series characteristics, wherein each of the plurality of datasets has been classified into one of a plurality of known classes based on expected properties of the dataset before receipt by the processor;

identifying, by the processor, a subset of anomaly detection methods for evaluating the plurality of datasets based on the known class associated with each of the plurality of datasets, wherein the subset of anomaly detection methods is filtered from a larger set of anomaly detection methods;

calculating, by the processor, an anomaly detection score for each of the subset of anomaly detection methods, the anomaly detection score based on false positives and false negatives detected by applying a sliding window across all datasets of the plurality of datasets;

calculating, by the processor, an anomaly score threshold value based on a minimum number of the false positives and false negatives in the sliding window across all datasets and a probationary period for each of the plurality of datasets;

identifying, by the processor, one of the subset of anomaly detection methods as a recommended anomaly detection method for use on time series data of a same class as the known class of the given time series, wherein the recommended anomaly detection method is identified by comparing the anomaly detection scores for each of the subset of anomaly detection methods to the anomaly score threshold value; and applying, by the processor, the recommended anomaly detection method to identify anomalies for additional time series of the same class.

2. The method of claim 1, wherein the known class includes at least one of seasonality, trend, concept drift, or missing time steps.

3. The method of claim 1, wherein the anomaly detection score is one of a windowed F-score and a Numenta anomaly benchmark (NAB) score, and wherein the anomaly score threshold value is based on a corresponding one of the windowed F-score or the NAB score.

4. The method of claim 1, wherein each of the plurality of datasets is labeled to identify anomalies therein.

5. The method of claim 4, wherein the probationary period of each of the plurality of datasets comprises unlabeled data.

6. The method of claim 1, the plurality of datasets comprising pre-annotated datasets across a variety of domains and scripts.

7. The method of claim 1, wherein an anomaly in at least one of the time series is a collective type.

8. The method of claim 1, wherein an anomaly in at least one of the time series is a point type.

9. The method of claim 1, wherein an anomaly in at least one of the time series is a contextual type.

10. The method of claim 1, wherein the larger set of anomaly detection methods are selected from windowed Gaussian, SARIMAX, Facebook Prophet, STL Residual Thresholding, Twitter AnomalyDetection, HOT-SAX, Generalized Linear Models, and Anomalous and Hierarchical Temporal Memory Networks.

11. A system for automatically determining an anomaly detection method for use on a class of time series, the system comprising:
at least one processor; and
a memory storing instructions that, when executed by the at least one processor, cause the at least one processor to:
receive a plurality of datasets for a given time series, wherein each of the plurality of datasets is associated with a different one of a plurality of predefined time series characteristics, wherein each of the plurality of data sets has been classified into one of a plurality of known classes based on expected properties of the dataset before receipt by the processor;

identify a subset of detection methods based on the known class associated with each of the plurality of datasets, wherein the subset of anomaly detection methods is filtered from a larger set of anomaly detection methods;

calculate an anomaly detection score for each of the subset of anomaly detection methods, the anomaly detection score based on false positives and false negatives detected by applying a sliding window across all datasets of the plurality of datasets;

calculate an anomaly score threshold value based on a minimum number of the false positives and false negatives in the sliding window across all datasets and a probationary period for each of the plurality of datasets;

identify one of the subset of anomaly detection methods as a recommended anomaly detection method for use on time series data of a same class as the known class of the given time series, wherein the recommended anomaly detection method is identified by comparing the anomaly detection scores for each of the subset of anomaly detection methods to the anomaly score threshold value; and apply the recommended anomaly detection method to identify anomalies for additional time series of the same class.

12. The system of claim 11, wherein the known class includes at least one of seasonality, trend, concept drift, or missing time steps.

13. The system of claim 11, wherein the anomaly detection score is one of a windowed F-score and a Numenta anomaly benchmark (NAB) score, and wherein the anomaly score threshold value is based on a corresponding one of the windowed F-score or the NAB score.

14. The system of claim 11, wherein each of the plurality of datasets is labeled to identify anomalies therein.

15. The system of claim 14, wherein the probationary period of each of the plurality of datasets comprises unlabeled data.

16. The system of claim 11, the plurality of datasets comprising pre-annotated datasets across a variety of domains and scripts.

17. The system of claim 11, wherein an anomaly in at least one of the time series is a collective type.

18. The system of claim 11, wherein an anomaly in at least one of the time series is a point type.

19. The system of claim 11, wherein an anomaly in at least one of the time series is a contextual type.

20. The system of claim 11, wherein the larger set of anomaly detection methods are selected from windowed Gaussian, SARIMAX, Facebook Prophet, STL Residual Thresholding, Twitter AnomalyDetection, HOT-SAX, Generalized Linear Models, and Anomalous and Hierarchical Temporal Memory Networks.

* * * * *